US009298478B2

(12) United States Patent
Meier et al.

(10) Patent No.: US 9,298,478 B2
(45) Date of Patent: Mar. 29, 2016

(54) ADAPTATION OF DATA FLOW OF ONE OR MULTIPLE SYSTEMS WITHIN A SYSTEM LANDSCAPE

(75) Inventors: Andreas Meier, Heidelberg (DE); Tobias Rasch, Wiesloch (DE)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 13/299,103

(22) Filed: Nov. 17, 2011

(65) Prior Publication Data

US 2013/0132940 A1 May 23, 2013

(51) Int. Cl.
*G06F 9/445* (2006.01)
*G06F 9/44* (2006.01)
*G06Q 10/06* (2012.01)

(52) U.S. Cl.
CPC *G06F 9/445* (2013.01); *G06F 8/38* (2013.01); *G06Q 10/06* (2013.01)

(58) Field of Classification Search
CPC .............. G06F 8/61; G06F 8/60; G06F 8/65; G06F 9/44505; G06F 9/4411; G06F 3/048; G06F 8/38; G06F 9/445
USPC ................................................. 717/168, 174
See application file for complete search history.

(56) References Cited

U.S. PATENT DOCUMENTS

| 5,583,993 | A   | * | 12/1996 | Foster et al. ................... 709/205 |
|-----------|-----|---|---------|-----------------------------------------|
| 7,853,651 | B2  | * | 12/2010 | Demuth et al. ................ 709/205 |
| 8,489,735 | B2  | * | 7/2013  | Befort ............................ 709/224 |
| 8,533,700 | B1  | * | 9/2013  | Feeser ............................ 717/168 |
| 2002/0065696 | A1 | * | 5/2002 | Hack et al. ........................ 705/7 |
| 2006/0143614 | A1 | * | 6/2006 | Lier et al. ...................... 718/100 |
| 2007/0038963 | A1 | * | 2/2007 | Moore ........................... 715/859 |
| 2007/0271172 | A1 | * | 11/2007 | Shapiro et al. ................... 705/37 |
| 2009/0089785 | A1 | * | 4/2009 | Marwinski et al. ........... 718/102 |
| 2011/0145789 | A1 | * | 6/2011 | Rasch et al. .................. 717/121 |

* cited by examiner

*Primary Examiner* — Hang Pan
*Assistant Examiner* — Hui-Wen Lin
(74) *Attorney, Agent, or Firm* — Mintz Levin Cohn Ferris Glovsky and Popeo, P.C.

(57) ABSTRACT

Disclosed are methods, systems and products, including a method that includes generating a system landscape overview including a context selection menu and an information window, the system landscape overview of a system landscape includes a plurality of systems identified by a unique identifier, the context selection menu enables modifying an import to at least one of the plurality of systems, and the information window provides metadata for the at least one of the plurality of systems; receiving, from the context sensitive menu, modification information representative of a schedule for an import to the at least one of the plurality of systems; determining, by a calculation engine, a workflow to install the at least one of the plurality of systems system; and providing the received modification information to a job scheduler to enable scheduling of the import to the at least one of the plurality of systems.

17 Claims, 29 Drawing Sheets

101

Job overview from: 06.06.2011 at: : :
          to:  06.06.2011 at: : :
Selected    job names: *
Selected user names: *
Client : *

☑ Scheduled  ☑ Released  ☐ Ready  ☑ Active  ☑ Finished  ☑ Canceled
☐ Event controlled    Event ID:
☑ ABAP program    Program name : *IMPORT*

| Job | Status | Start date | Start time | Duration(sec.) |
|---|---|---|---|---|
| SDC_IMPORT_ALL | Finished | 06.06.2011 | 13:00:17 | 1 |
| SDC_IMPORT_ALL | Finished | 06.06.2011 | 14:00:17 | 1 |
| SDC_IMPORT_ALL | Finished | 06.06.2011 | 15:00:17 | 2 |
| SDC_IMPORT_ALL | Finished | 06.06.2011 | 16:00:17 | 29 |
| SDC_IMPORT_ALL | Active | 06.06.2011 | 17:00:17 | 4.094 |
| SDC_IMPORT_ALL | Finished | 06.06.2011 | 18:00:18 | 2 |
| SDC_IMPORT_ALL | Released | | | 0 |

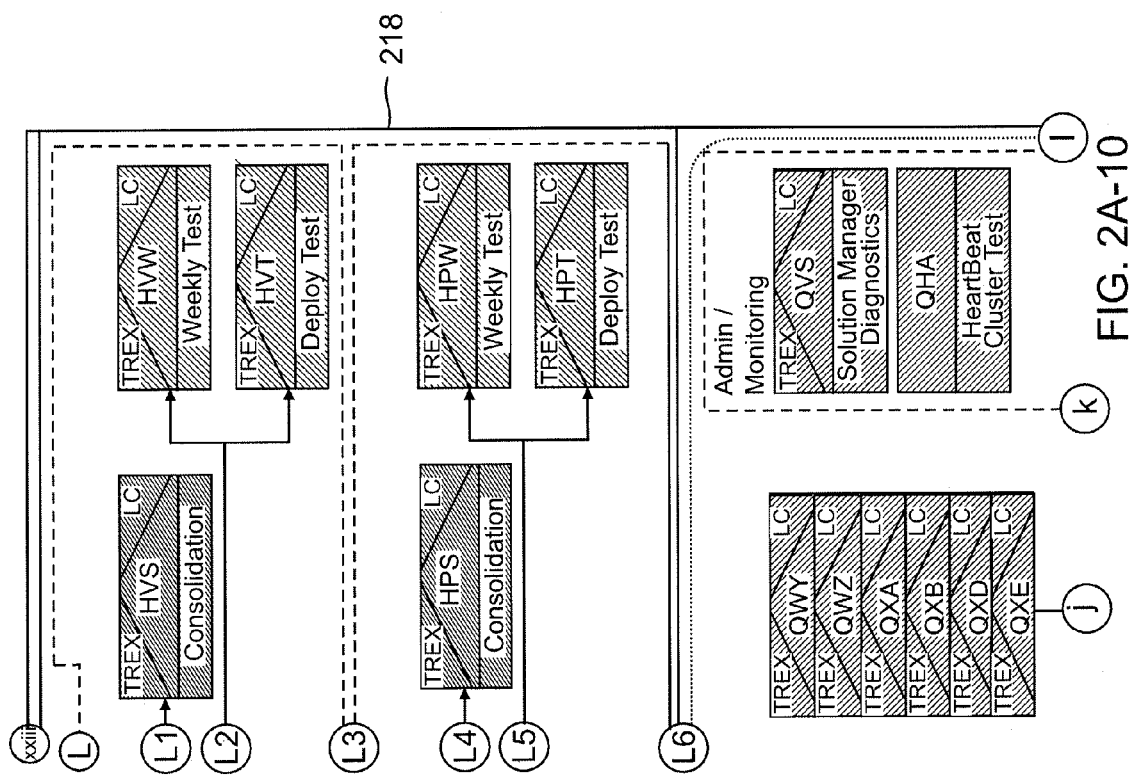

| FIG. 2A-1 | FIG. 2A-2 | FIG. 2A-3 | FIG. 2A-4 | FIG. 2A-5 |
|---|---|---|---|---|
| FIG. 2A-6 | FIG. 2A-7 | FIG. 2A-8 | FIG. 2A-9 | FIG. 2A-10 |
| FIG. 2A-11 | FIG. 2A-12 | FIG. 2A-13 | FIG. 2A-14 | FIG. 2A-15 |
| FIG. 2A-16 | FIG. 2A-17 | FIG. 2A-18 | FIG. 2A-19 | FIG. 2A-20 |

US 9,298,478 B2

ADAPTATION OF DATA FLOW OF ONE OR MULTIPLE SYSTEMS WITHIN A SYSTEM LANDSCAPE

BACKGROUND

The present disclosure relates to data processing.

Various tools and applications are available to provide a user with at least partial representation of features of a computing system. For example, some tools and applications may be used to illustrate which system ships software to which other. Other tools and applications may be used to display system lifecycle for a certain system or groups of systems. Additionally, various tools and applications may be used to illustrate layers and software components.

SUMMARY

In one aspect, a method is disclosed. The method includes generating a system landscape overview including a context selection menu and an information window, the system landscape overview of a system landscape includes a plurality of systems identified by a unique identifier, the context selection menu enables modifying an import to at least one of the plurality of systems, and the information window provides metadata for the at least one of the plurality of systems; receiving, from the context sensitive menu, modification information representative of a schedule for an import to the at least one of the plurality of systems; determining, by a calculation engine, a workflow to install the at least one of the plurality of systems system; and providing the received modification information to a job scheduler to enable scheduling of the import to the at least one of the plurality of systems.

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 1B depicts an example of metadata information representative of imports of software and/or data;

Like reference numbers and designations in the various drawings indicate like elements.

DETAILED DESCRIPTION

Figure 1D:
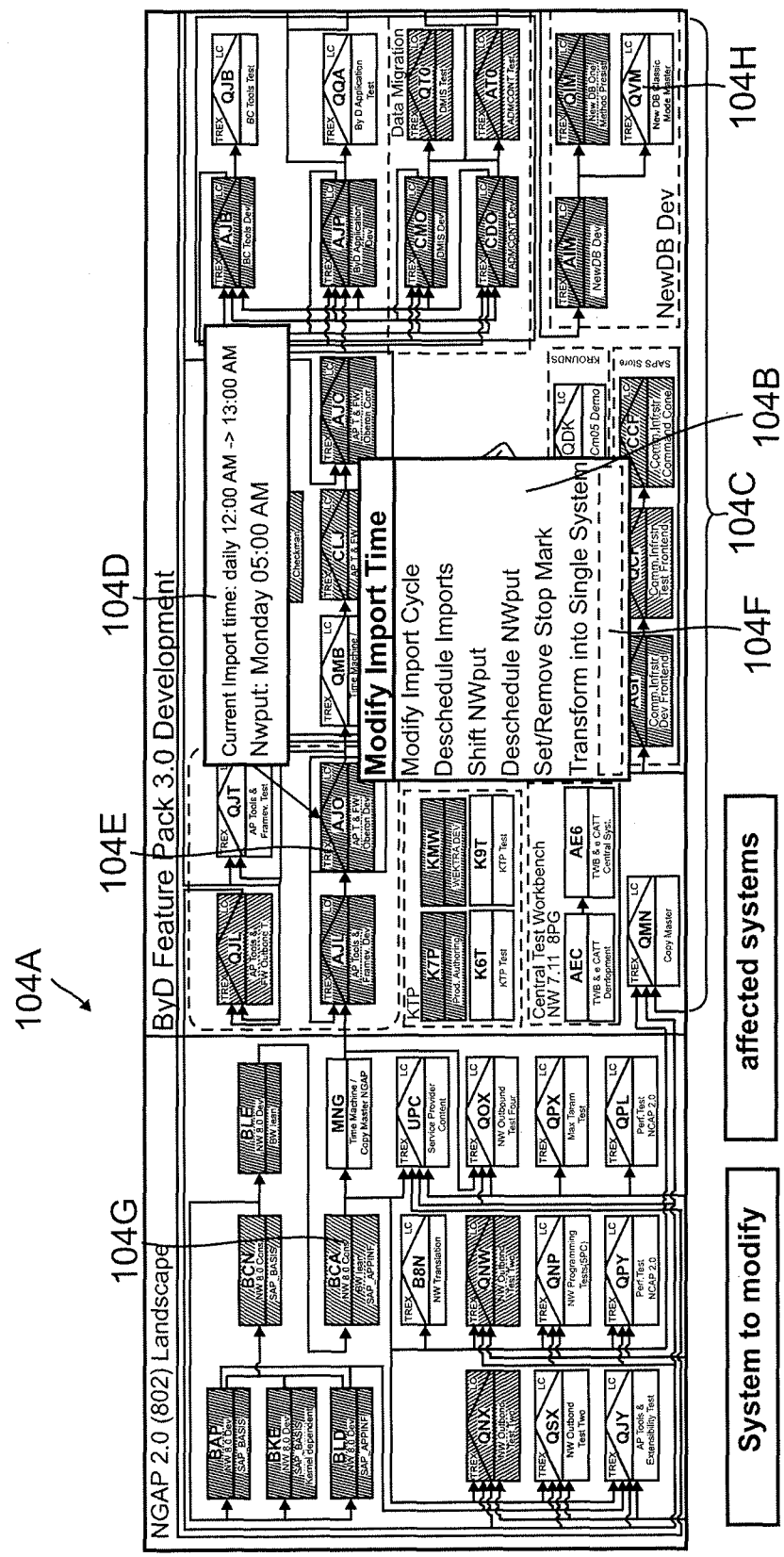
FIG. 1D depicts an example system landscape overview diagram including a context selection menu for adapting an import and a window providing metadata, such as scheduling information.
Figures 1, 2A:
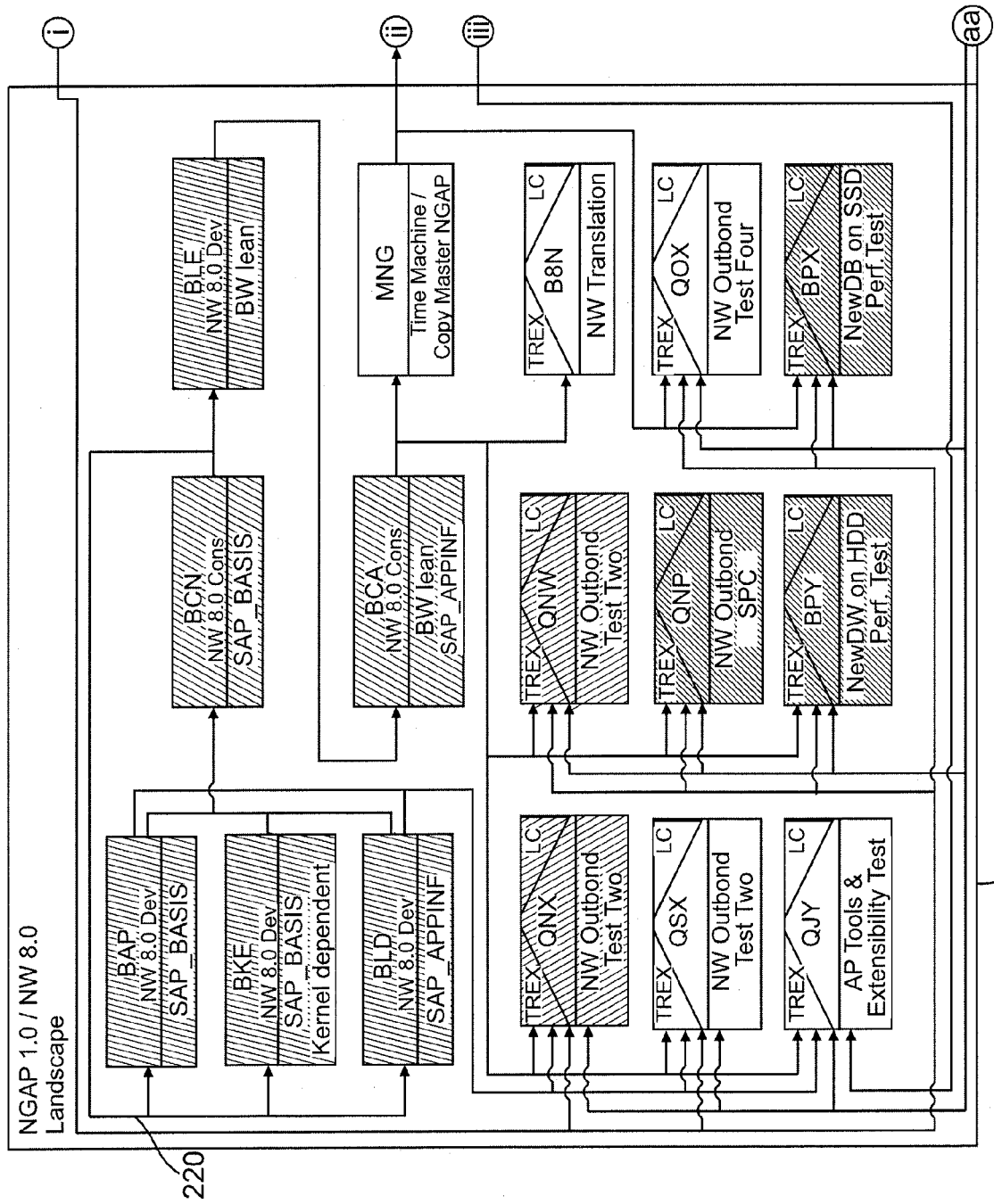
FIGS. 2A-2B depicts examples of a system landscape overview.
Figures 2, 2A:
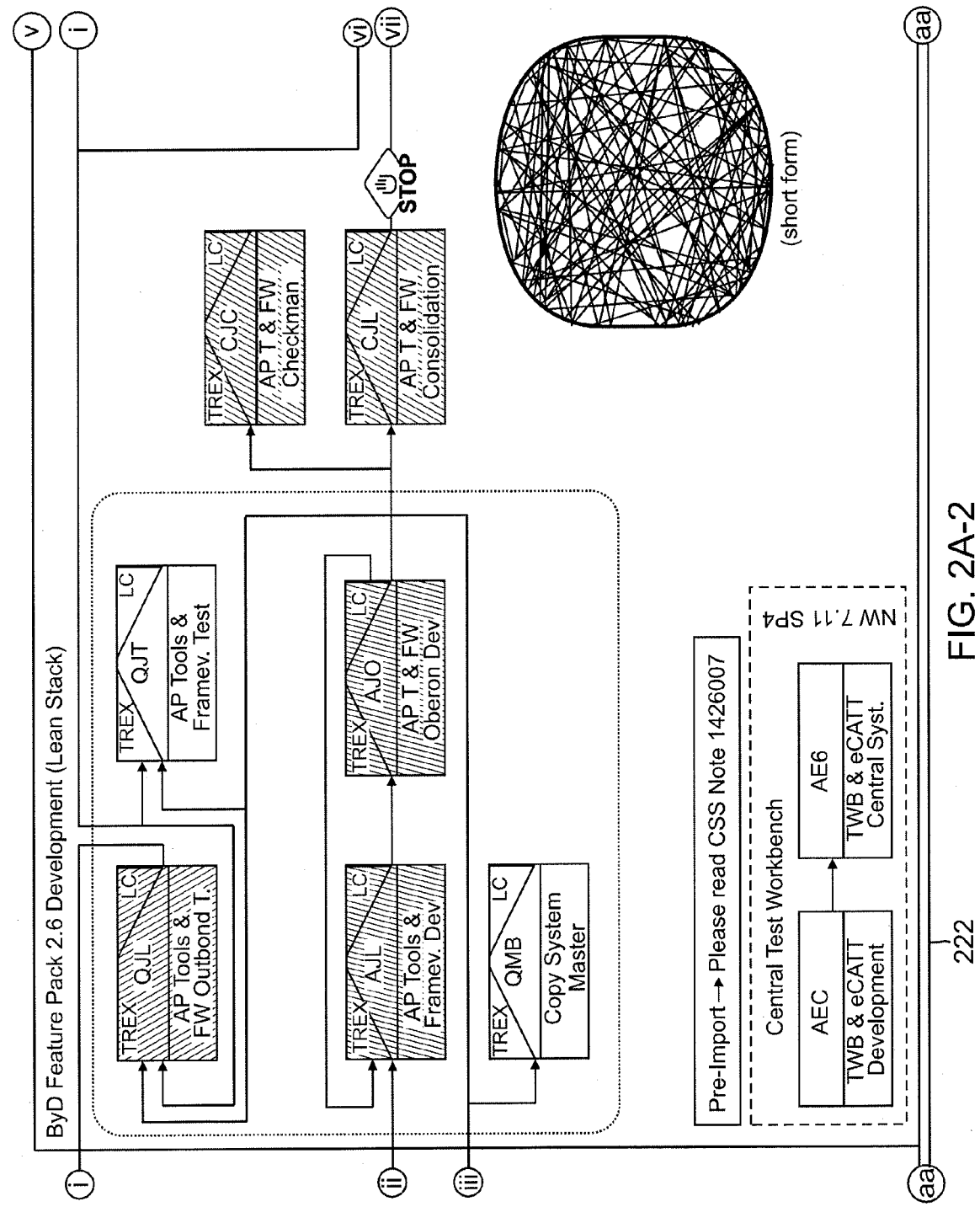

A system landscape may be defined to support the life cycle of an application, such as for example a business system application used in connection with enterprise resource planning. The system landscape represents in a graphical manner the interrelationship between systems (which may also be referred to as subsystems, components, etc.) used in the business application. The system landscape may facilitate creating or inserting new systems within the business system application by allowing a developer to see the impact of the creation or insertion on other adjacent systems. Moreover, within the system landscape, there may be transport routes defining how to transport new/upgraded software from one system within the system landscape to another system within the system landscape. An example of a system landscape overview is depicted at FIGS. 1D, 2A, and 2B, which is further described below.

The disclosed subject matter may be used to adapt the transport time of a system and the corresponding rules. For example, if a user wants to change the next import time of a system BCA 104G, the systems, methods, and articles disclosed herein may be used to determine the impact on one or more other systems, such as subsequent systems including system QVM 104H (e.g., in the transport chain as well as all neighbor/parallel/adjacent systems of 104A depicted at FIG. 1D). Based on expected import times, historical data from other systems in the transport chain, number of tenants, rules (e.g., do not allow imports during the night shift) for systems, and/or transport routes defining dependencies between systems, a small modification of a front-end system (e.g., system BCA 104G) may have substantial impact on other systems in the landscape. To alleviate the impact, a modification may be proposed and then the impact of the proposed change may be assessed by the systems, methods, and articles disclosed here. For example, an action may be proposed to change an aspect of system BCA 104G to see what would happen to subsequent systems and then whether the change should proceed or not. During this process, a user may be visually presented with the change (or adaptation) to a system (e.g., the impact of delaying the import of the system by a day, a month, a week, and so forth) and the impact to other systems. The user may then be able to decide whether to proceed with the planned modification to BCA 104G or delay the modification. When the decision to proceed with the modification is made (e.g., changing when the change should take place), adaptation may then be made to the other subsequent systems.

Moreover, the modification (e.g., a create, a move, an upgrade, and/or an install) of a system might have effects on subsequent systems within the affected transport route as well. For example, the shipment of an upgrade may be defined in a well defined order and thus the modification of a system may impact this well defined order in order to maintain proper operation of the installation. To that end, a calculation engine 196 may be configured at system 100 to determine (e.g., calculate, select, and the like) a workflow to install system(s) and activate rules defining the installation of those systems (e.g. time slots when each system is installed). Calculation of rules may be based on the order of systems, any special requirements for a given system, the requirements of a given customer of a system (e.g., import of a system is not to be performed during the business day), and the like. This information may be stored in a repository that is accessible by the job scheduler.

There are some tools to show in a graphical, easy understandable, representation all assigned systems of a project to represent the releases and layers as well as a software flow oriented chain of systems. An example of such a system is described in U.S. application Ser. No. 12/979,923, filed Dec. 28, 2011, and entitled "System Landscape Overview Generator,", which is incorporated by reference in its entirety herein.

But there are no mechanisms to calculate and visualize effects on all of the affected systems of the system landscape during a planned modification. The mechanisms may also enable a check of the plausibility of the planned modification of transport properties.

In some implementations, information may be collected (and/or extracted) for transporting and/or managing the modification/installation of one or more systems within a system landscape including a plurality of systems of a business application. This information may include when an import of a system into the system landscape will take place, rules for a given customer (e.g., allowed times for importing), and the like. This information may be depicted on a system landscape overview as, for example, mouse-over information or any other type of representation for a system. After collecting this information, a graphical system landscape overview diagram representation may be generated to allow modification in a way that transport times for a system in the system landscape can be adapted by, for example, the use of a context sensitive menu with properties, such as postpone by 1 day, re-schedule to hourly, and the like.

Next, the calculation engine 196 may calculate candidate transport rules for the system being modified with an import of a system and for any affected, subsequent systems. This may be visualized in a system landscape overview diagram representation which can be enriched with available information to include any new information (including new candidate transport rules) to visualize differences and mark affected transport routes. In some implementations, the job scheduler may highlight one or more candidate transport routes on the system landscape overview based on a given customer's rules for deployment of systems.

In some implementations, a context sensitive menu may be used to define special rules for adapting a system (e.g., an import should be delayed to a given date) and mark the system in the system landscape overview when a determination is made that a special rule will not be satisfied. For example, a system in the system landscape overview may be highlighted to show that the system cannot be imported at a proposed time because it violates a customer rule regarding when imports can be implemented.

A system may be described in terms of transport /software logistics perspective by its import frequency (e.g., how often it is updated with new data or software), the systems from where it gets supplied with the imports (e.g., predecessor systems), the systems to which it supplies data and/or software (e.g., successor systems), information about the kind of import (e.g., unattended import, imports requiring human interaction, etc.), expected import runtime, and systems which prohibit imports. This information may be used to determine transport scheduling for a system.

Figure 1A:
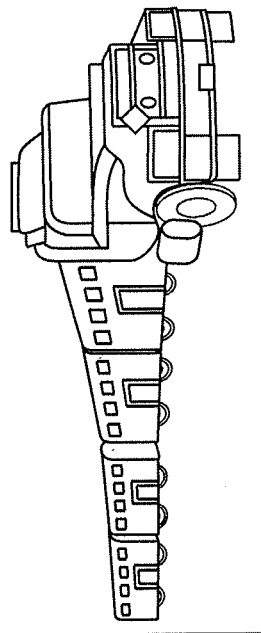
FIG. 1A depicts an example of a transport schedule.

FIG. 1A depicts an example of a page 100A presented at a user interface. Page 100A includes an example of a schedule when the system, AJO, is supplied with one or more transports. The term transports refers to a package of data including code and/or other information being imported, during a modification, into a system of the system landscape. In the example of FIG. 1A, there is a weekly transport which imports data every Wednesday at 21:00. The second transport is an import which occurs every hour, and the next import is scheduled to occur at 23:00.

FIG. 1B depicts a page 101 presented at a user interface. The page 101 includes information related to imports that have occurred, the next scheduled import job, and the status of any currently running import jobs. For example, jobs 199 have been finished and thus installed into the system landscape depicted by the system landscape overview. Job 198 is active and thus currently being imported into the system landscape depicted by the system landscape overview. And, job 197 is shown as released. The information depicted at page 100A may be maintained by the job scheduler for each of the systems of the system landscape. Moreover, this information may be displayed in a window, such as window 104D described below with respect to FIG. 1D. The duration column 196E represents the import run time duration of past imports which may be considered by the job scheduler during a transport flow calculation. In the example of FIG. 1B, a job ran for a relatively short period (e.g., 2 seconds), while another job ran for a relatively longer period of time (e.g., 4,094 seconds). This duration information may be used by job scheduler to schedule jobs, e.g., when an import to a system may be performed.

Figure 1C:
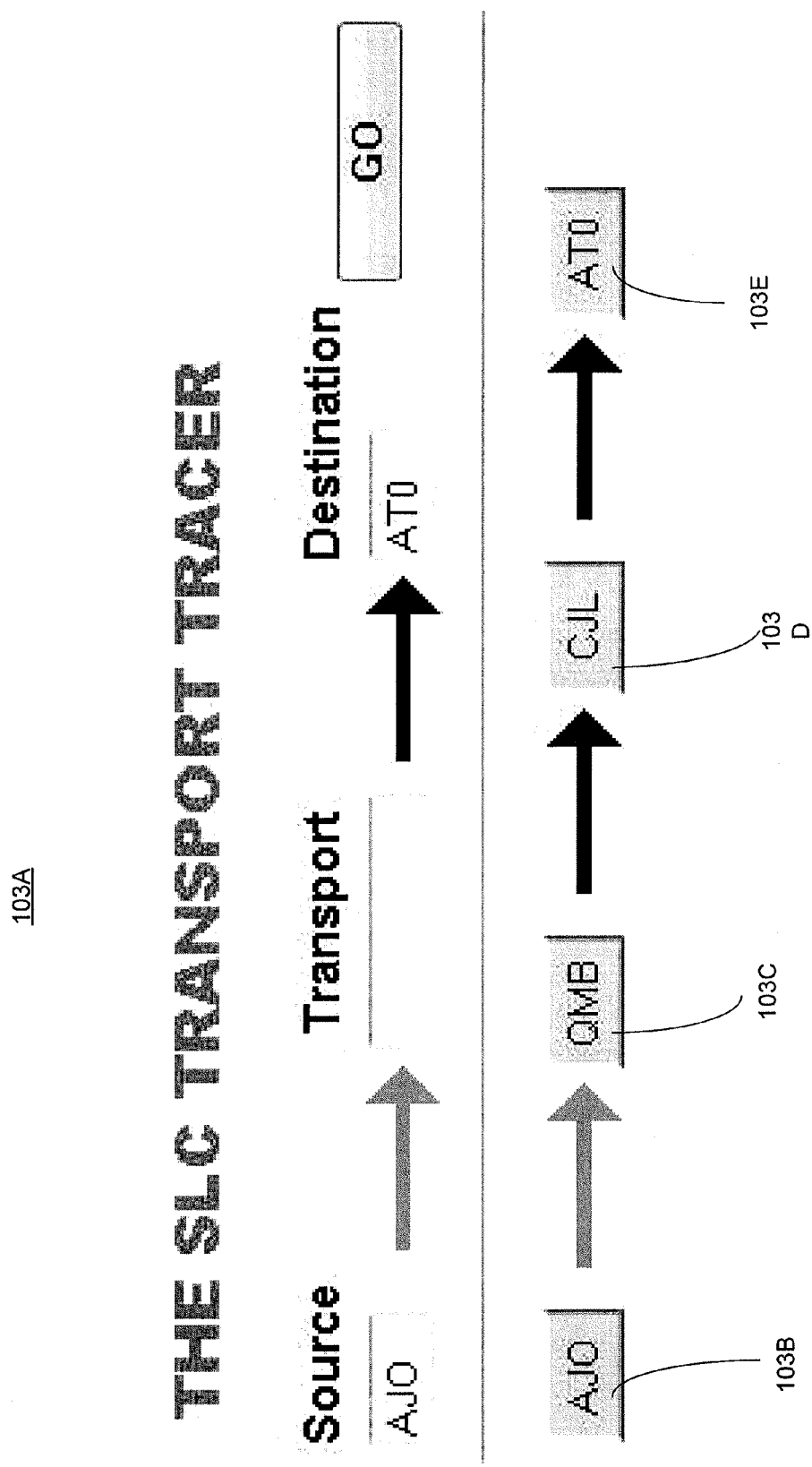
FIG. 1C depicts an example of a transport route through systems of a system landscape.

FIG. 1C depicts a page 103A presented at a user interface. Page 103A includes an example of a transport route of an import AJO 103B through system landscape including systems 103C-E. After being released, the transport from system AJO 103B is imported through several systems in a predefined sequence, e.g., through system 103C, then 103D, and then the destination of the import, system 103E.

FIG. 1D depicts a page 104A which may be presented at a user interface. The page 104A depicts an example of a system landscape overview including a context sensitive menu 104B and a window 104D providing metadata for a system 104E which is the subject of an import adaptation. Each system in the system landscape overview is identified with an identifier, which in the example at FIG. 1D includes 3-letters, although other types of identifiers may be used. Each identifier may be mapped to metadata describing the code being used at the system, the release data of the code, and other system information, such as the information depicted at FIG. 1B. Moreover, the system landscape overview may depict the transport relationships between systems and information, such as the identity of systems (or software components) that are part of the system landscape, whether any system (or software component) is being developed in the system landscape, and whether any transports (e.g., including systems, software components, data, etc.) have been imported into, or from, the system landscape.

In the example of FIG. 1D, the system landscape overview depicts a plurality of systems, such as BAP, BKE, BLD, and so forth, the system landscape overview also depicts that the systems in 104C are under development. These are generally the systems where a developer will focus his/her attention during the adaptation process. The system landscape overview also includes a context sensitive menu 104B and a job information window 104D. The transport of system AJO 104E is being modified via the context sensitive menu 104B. In particular, the import of system AJO 104E is being modified as shown at 104B from the current import time depicted at 104D.

As long as transport meta data is described completely for every system in the system landscape overview, the job scheduler may calculate the impact on the transport flow of the modification to the import time. The system landscape overview may be enhanced by showing the transport metadata, such as the window 104D, and the context sensitive menu 104B that allows adaptation of transport times for each system of the system landscape overview.

This system landscape overview may be used to visualize the result of adapting, for example import times and schedules to each affected system including the outcome of metadata analysis. For example, the job scheduler may generate information for presentation at system landscape overview. The generated information may allow visualization of delays within a transport route. For example, window 104D may show that system 104E does not allow imports at certain times (e.g., "no import between xx:00 and yy:00") and such warning may be highlighted (e.g., using a specific color, shape, etc.) to show any impact on the import to allow a adaptation of the import by changing when the import of system 104E takes place.

FIG. 1D may also depict additional metadata as one or more parameters to allow an import schedule calculation. For example, the additional data may include rules and/or preferences, such as "don't import during our office hours," "don't import today because a demo/test is running," "don't import on Friday 13$^{th}$," "import hourly," "import during lunchtime." Moreover, the additional metadata may include system data, such as the number of tenants, which may also impact the runtime / duration of an import job. Moreover, the additional metadata may include service data describing the capacity of service related groups to perform import activities. This additional metadata may be displayed in a window, such as window 104D, when a system is selected (e.g., by hovering a mouse over the system presented at the system landscape overview).

Each system in the system landscape overview of FIG. 1D may be identified with an identifier, such as 3-letters, although other types of identifier may be used. Each identifier may be mapped to metadata describing the code being used at the system, the release data of the code, and the like. Moreover, the system landscape overview may depict the transport relationships between systems and information, such as the identity of systems (or software components) that are part of the system landscape, whether any system (or software component) is being developed in the system landscape, and whether any transports (e.g., including systems, software components, data, etc.) have been imported into, or from, the system landscape.

Figure 1E:
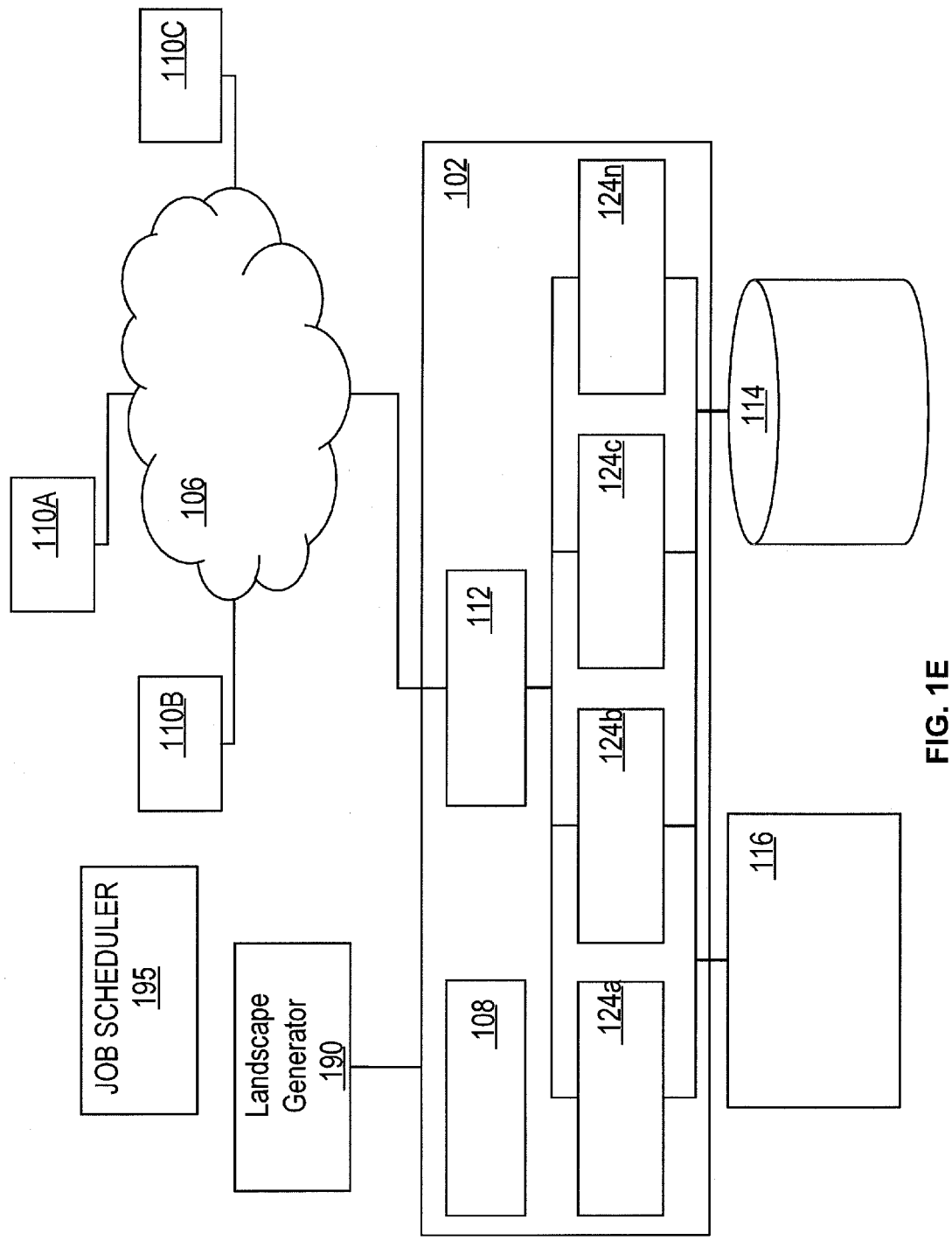
FIG. 1E shows a block diagram of a multi-tenant implementation of a software delivery architecture.

FIG. 1E shows a block diagram of a multi-tenant implementation of a software delivery architecture including a landscape generator 190, a job scheduler 195, and a calculation engine 196, although the landscape generator 190, job scheduler 195, and calculation engine 196 may be implemented in other types of implementations as well. The system 100 may include an application server 102, which can, in some implementations, include multiple server systems 124*a-n* that are accessible over a network 106 from client machines operated by users at each of multiple organizations 110A-110C (referred to herein as "tenants" of a multi-tenant system and/or as "clients") supported by the system 100. Additional or fewer clients may be in communication with the server 102 via the network 106. Each of the clients 110A-C may constitute at least part of a local server serving at least one of a plurality of entities. Such entities can include different companies that may or may not be related to one another, or may include any type of user that can access any one of the servers 124*a-n*. The one or more clients 110A-C are configured to enable users to provide input and receive data (displayable, for example, via local interfaces coupled to the respective clients 110A-C). The one or more clients 110A-C communicate with the one or more application servers 124*a-n* via, for example, direct wire-based links, network communication links, wireless communication links, etc.

For a system in which the application server 102 includes multiple server systems 124, the application server can include, in some embodiments, a load balancer 112 to distribute requests and actions from users at the one or more clients 110A-110C to the one or more server systems 124. A user can access the software delivery architecture across the network using a thin client, such as for example a web browser or the like, or other portal software running on a client machine. The application server 102 can access data and data objects stored in one or more data repositories 114. The application server 102 can also serve as a middleware component via which access is provided to one or more external software components 116 that can be provided by third party developers.

The servers of the application server 102 may each be executing a set of services (also referred to as "application services") that process/serve users' requests. For example, a user, interacting with the application server 102 through, for example, one of the interfaces of the clients 110A-C, can submit a request for service by one or more of the applications on the one or more servers of the application server 102, that cause one or more instances of the applications required to serve the request to be invoked. In some embodiments, the application server system 102 may include systems/components/modules, such as, for example, a message server to enable communication between the individual servers and/or between the application server 102 and other application servers (e.g., transmitting requests and data from one application server to another and responding to requests for information to enable generation of a landscape directory). In some implementations, a message server may monitor and manage information about the application servers and/or their respective servers, e.g., information such as current request loads and data traffic supported by the various servers.

To provide for customization of the core software platform for each of multiple organizations / entities supported by the system 100, the data and data objects stored in the repository or repositories 114 that are accessed by the application server 102. In some embodiments, the repository 114 may be implemented using, for example, a database system that generally includes a data management application (which may be executing locally or remotely) and one or more data storage devices (i.e., memory devices, which may be distributed over a network), in which data relating to the objects to be managed is maintained. The data management application may be a commercial or customized data management system, e.g., a database management application implemented in software and executing on processor-based servers. Microsoft SQL server is an example of a commercially available database management application. The database system may also include a communications module to enable it to communicate with remote devices (e.g., wirelessly, through a network gateway connection, or through wired links). In some implementations, a database interface may include a buffer, or cache, to store frequently accessed data in the local memory of the application server.

Figure 1F:
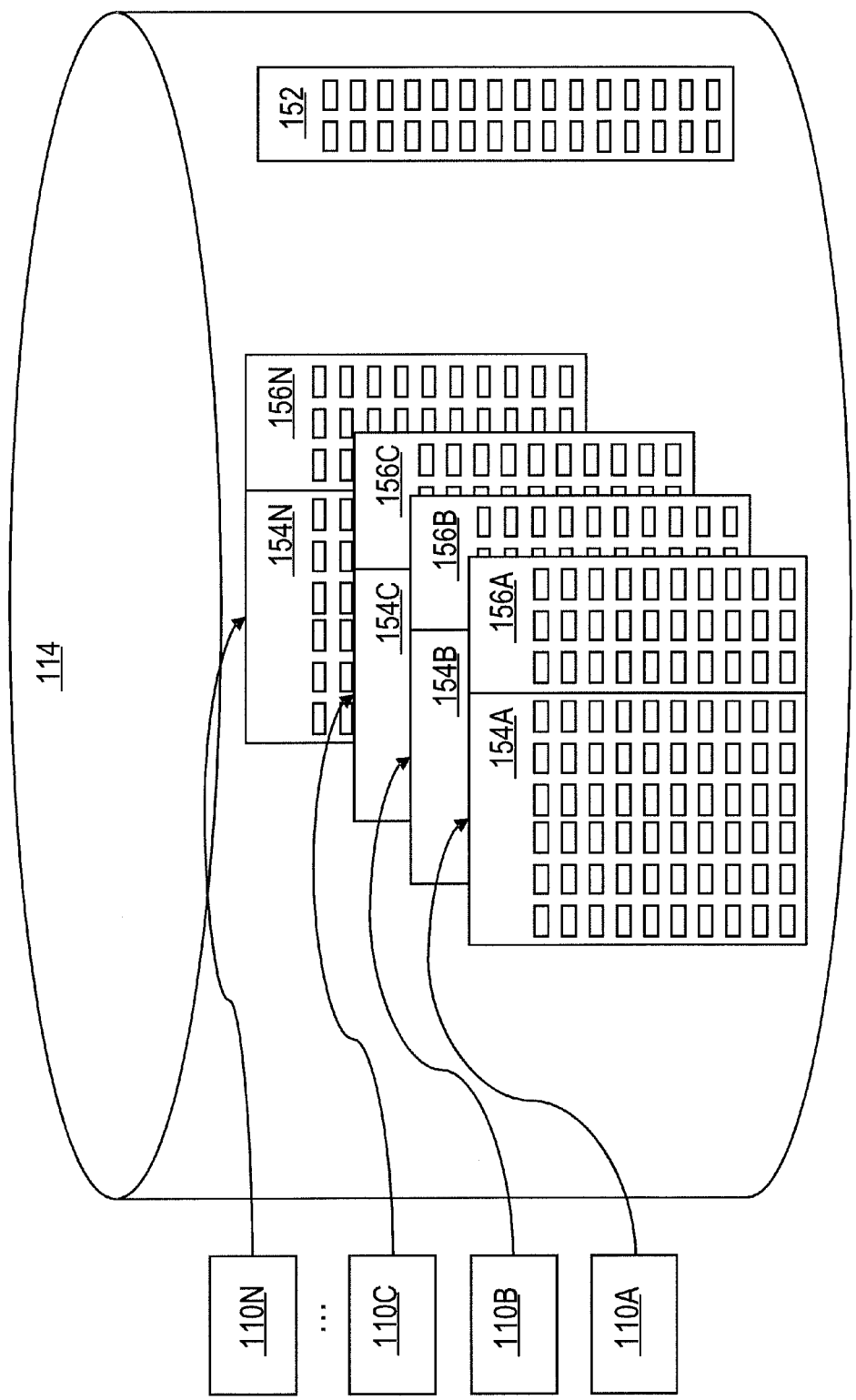
FIG. 1F shows examples of three types of content used in the system of FIG. 1E.

Data stored in the repository 114 may include, in some embodiments, three types of content as shown in FIG. 1F: core software platform content 152, system content 154, and tenant content 156. Core software platform content 152 includes content that represents core functionality and is not modifiable by a tenant. System content 154 can in some examples be created by the runtime of the core software platform and can include core data objects that are modifiable with data provided by each tenant. For example, if the core software platform is a business system, such as an enterprise resource planning (ERP) system that includes inventory tracking functionality, the system content 154A-154N can include data objects for labeling and quantifying inventory. The data retained in these data objects may be tenant-specific: for example, each tenant (e.g., a client) 110A-110C stores information about its own inventory, which might be kept private (i.e., inaccessible to other clients unless authorized by the tenant). Tenant content 156A-156N includes data objects or extensions to other data objects that are customized for one specific tenant 110A-110C to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 156 can include condition records in generated condition tables, access sequences, price calculation results, or any other tenant-specific values. A combination of the software platform content 152 and system content 154 and tenant content 156 of a specific tenant are presented to users from that tenant such that each tenant is provided access to a customized solution whose data are available only to users from that tenant.

A multi-tenant system such as that described herein may include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 102 that includes multiple server systems 124a-n that handle processing loads distributed by a load balancer 112. Potential benefits from such an arrangement can include, but are not limited to, high and reliably continuous application server availability and minimization of unplanned downtime, phased updating of the multiple server systems 124 to permit continuous availability (one server system 124 can be taken offline while the other systems continue to provide services via the load balancer 112), scalability via addition or removal of a server system 124 that is accessed via the load balancer 112, and de-coupled lifecycle processes (such as for example system maintenance, software upgrades, etc.) that enable updating of the core software independently of tenant-specific customizations implemented by individual tenants.

In some embodiments, at least some of the clients 110A-C and/or the servers 124a-n of the application server 102 may be implemented based on a cloud-based system, such as SAP's By Design system. A cloud-based system generally enables a user at, for example, the client 110A to access core/central system resources on-demand. These core/central resources comprise business software-based systems hosted at a remote location in the cloud, e.g., accessed via the Internet. The cloud-based system may include a heterogeneous system of different subsystems providing a management system for managing financials, customer relationships, human resources, projects, procurement, and/or a supply chain. The cloud-based system may include a "central component(s)" located remotely in the so-called cloud. These central components are shared, for example, by tenants, such as ABAP (Advanced Business Application Programming) client applications. For example, the clients 110A-B may be located at one or more user locations, but the application server 102 including the repository 114 may be accessed as a service on-demand via a cloud. Although ByDesign and cloud based software-as-a-service systems are noted herein, the subject matter described herein may be used in other systems as well.

System 100 may, as noted, further include a landscape generator 190. The landscape generator 190 may be configured to collect/receive data relating to features of a computing system, and further configured to generate a diagram, based on the collected/received data, representative of the features of the system with respect to which the data was collected/received. Examples of the pages depicting the system landscapes generated by landscape generator 190 are shown at FIGS. 1D, 2A, and 2B.

With reference to FIG. 2A, an example system landscape overview page 200 is depicted. The system landscape overview page 200 may represent all of the systems associated with a business application. Moreover, the system landscape overview page 200 may, in some implementations, be generated by landscape generator 190 based on system information stored in a repository, and then the generated page (e.g., a hypertext markup language page) is presented at a user interface.

The diagram 200 shown in FIG. 2A provides a representation of several systems (which may also be referred to herein as subsystems), such as subsystems 202-224. Each such subsystem may be an application, a system comprising several applications, or may otherwise represent any abstraction of a computing arrangement at any hierarchical level of system or network arrangement. Each of the subsystems represented in the diagram may provide a representation of at least some of the individual processing components (e.g., modules constituting an application). For example, the subsystem 202 comprises processing components 230-251. The area of the diagram depicting the subsystem 202 provides a graphical representation of the configuration / arrangement of the components constituting that subsystem, including data flow between various individual components of the subsystem. The example diagram 290 of FIG. 2B provides another example landscape representation of a system, including at least some of the system's subsystems (and their components), the interrelationships between the subsystems and/or the components, etc.

The landscape diagrams described herein, including, for example, the example diagram 200, include graphical representations of at least some of the features of the system in question, including, for example, a graphical representation of an order of release of at least some of the subsystems constituting the system and layered relationship information, e.g., layered relationships between various subsystems of the computing system. More particularly, in some implementations, the vertical positioning of subsystem representations (e.g., the respective blocks representative of the subsystems) may be used to represent the order of release, and can thus provide a representation of the development history (or evolution) of the subsystems. In the example of FIG. 2A, the subsystem 220, identified as NGAP 1/NW 8.0 (i.e., release 8.0 of the NetWeaver application, which is a platform that provides development and runtime environment for SAP applications and can be used for custom development and integration with other applications and systems), is positioned at a higher vertical position than the block representing the subsystem 208, which is identified as NW 7.2L (i.e., NetWeaver release 7.2L), indicating that the components (and other represented features, including the inter-component configuration of the subsystem 222) were released (or rolled-out) subsequent to the subsystem components, and other features, depicted in the block representing the subsystem 208. Similarly, the subsystem 208 depicting at least part of the subsystem features for NetWeaver, Release 7.2L, is located at a higher vertical positioning in the diagram 200 than the block 202 which depicts features corresponding to NetWeaver, Release 7.11. Thus, the vertical positioning of blocks provides an easy visual tool for a user to identify the order of release of various aspects of the subsystems depicted in the diagram.

In some implementation, the representation of the order of release of one or more subsystems may be used to indicate the constituents/components of the subsystems (and their configuration) at various release date. That is, in some embodiments, instead of representing the entire subsystem in a single block, the subsystem configuration may be divided into several blocks that each corresponds to a different release date for that subsystem. Under such circumstances, a portion of the subsystem released at a particular date will occupy a different block (in the landscape diagram) than portions of the subsystem released at different dates. Such a representation enable breaking the subsystem representation into more manageable multiple blocks that also convey to the user important information on the evolution of the subsystem in question (e.g., when was a particular functionality of the subsystem, implemented using the components depicted in a block, released).

Another feature that may be represented in a diagram, such as the diagram 200, is the layered relationship between various subsystems, including, for example, data flows between the subsystem, hierarchical relationships between the subsystems constituting the layers of the system represented by the diagram, etc. In some implementations, system layer information is provided, for example, through the horizontal positioning of the subsystem representations (e.g., blocks) in the diagram. In the diagram 200, the layered relationship between blocks 212 and 216 can be represented by the horizontal positioning of the blocks. In the embodiments of FIG. 2A, blocks located farther along the horizontal axis (the x-axis) indicate that their corresponding subsystems are at a higher layered relationship compared to blocks that are closer to the origin of the horizontal axis (i.e., farther to the left). For example, as shown in FIG. 2A, the subsystem depicted in block 212 provides input to the subsystem of block 216 (labeled VLab FP2.6), which is located farther along the horizontal axis than does block 212, thus indicating that the subsystem of block 216 is at a higher layered relationship compared to the subsystem represented by Block 212. Accordingly, the diagram 200 provides an easy-to-understand visual tool to identify the layered relationship of the subsystems depicted in the diagram.

Features of the system relating to data flows of individual components (e.g., modules) of the subsystem may also be represented. As illustrated, the configuration of the subsystem 212 includes data flows between individual components of the subsystem 212. For example, the processing component 260 of the subsystem 212 is in communication with the components 262, 264, and 266, and provides them with data and/or instructions/commands. Processing block 264, in turn, is also in communication with processing blocks 268 and provides that block with input (e.g., data and/or instructions/commands). The input/output flows of the subsystem 222, as well as other subsystems depicted in the diagram 200, thus provides an easy-to-understand representation of interrelations of the various components of the subsystems (e.g., configuration and data flows), as well as the interrelationships between the subsystems themselves. The diagram 200 illustrates the data flow information using directional arrows (e.g., an arrow going into a particular component or into a subsystem represents input into that subsystem, and similarly, directional arrows flowing out of components and subsystems represent output flows). Other ways to represent communication paths and flows within the system are also possible.

In some implementations, the generated system diagram may include additional information representative of further features of the system, its subsystems, and/or the subsystems' components. For example, and as shown in FIG. 2A, the diagram 200 may include text-based data representative of at least one of, for example, identity of the system/subsystems/components (e.g., their names or codes identifying the various parts of the system), developmental status for at least one of the subsystems, usage for at least one of the subsystems of the computing system, number of installed layers, etc. Information regarding the above features (identity, status, etc.) may also be provided through color codes, fill-patterns used to fill the various objects appearing in the diagram, the particular shape of the objects, etc. For example, as shown, the diagram 200 includes, with respect to the subsystem 220, the subsystem identity (which may be an abbreviation, acronym or code) of "NGAP 1.0/NW 8.0 Landscape," as well as release number (as noted above, order of release information is also conveyed by the relative vertical positioning of subsystems' blocks relative to other blocks). Text-based data may also be used to annotate the diagram and provide additional useful information. For example, the subsystem 211 (appearing within the subsystem 210) includes the annotations "Productization and Validation" and "Special System" to provide some information about the role and nature of the subsystem depicted in the block.

Color-code data, fill-pattern data, and pre-defined geometrical shapes may be used to further represent data regarding features of a computing system, its subsystems, and of the subsystems' components. As shown, FIG. 2A includes a legend 270 defining various shapes, color, and/or fill-patterns representative of various aspects/features of the system represented by the diagram 200. For example, the legend 270 defines the square-shaped symbol 272 with its associated illustrated fill-pattern (and which may also include a pre-defined color) as being representative of development/correction components. Thus, components appearing in the diagram 200 that have the geometric shape (square) and fill pattern of the symbol 272 correspond to components/modules/subsystems that, for example, are under development. In the example of FIG. 2A, the component 235 in the subsystem 202 (identified as "X9M") and component 282 in the subsystem 212 (identified as "HCC") are two components that are indicated to be under development. As another example, the legend also includes the square-shaped symbol code 274 having a dark fill-in pattern, that corresponds to components (e.g., modules) that are planned for disassembly (e.g., to be discontinued). In the example of FIG. 2A, the component 236 in the subsystem 202 (identifies as "C2F") and the component 237 in the subsystem 202 (identified as "C2M") are two components that are represented, using easy-to-understand graphical/visual representation, as components that have been designated to be disassembled at some point in the future.

Additional representations based on pre-defined color, pre-defined fill-patterns, and pre-defined geometric shapes include symbol codes 276a-m shown in the legend 270, which include, respectively, a symbol code 276a to represent an add-in component (represented as a blank right-angle triangle), symbols codes to represent active or partly active components (symbols 276b-c), a symbol 276d to represent a separately installed system or component, a symbol code 276e to represent a clone of a separately installed system or component, a symbol code 276f to represent a main system test, a symbol code 276g to represent a consolidation system (or component), a symbol code 276h to represent subsystems/systems set up in a customer like way (such systems are sometimes referred to as "TCO Lab," or "Systems of Verification lab"; these systems may also be represented with a special color to indicate that these systems are separated on a network level from a development network), a symbol code 276i to represent that the corresponding system/subsystem/component is not yet available, a symbol code 276j to, in some embodiments, represent a link to a separate landscape, and in some embodiments, to represent a system with special focus (e.g., like the frame 299 of FIG. 2B), a symbol code 276k that, in some embodiments, indicates that a web dispatcher is available (in some implementations, SAP's Web-Dispatcher may be used to access all the systems and thus the symbol 276*k* may not be needed), a symbol code 276*l* (e.g., an ellipse) indicating that the corresponding system/subsystem/component has moved, and an arrow symbol code 276*m* representative of a transport route (e.g., to represent data flow paths). Fewer or additional symbol codes, each represented by a pre-defined color(s), a pre-defined geometric shape, and/or a pre-defined fill-pattern, may be used in conjunction with the legend 270, and by extension, in conjunction with the landscape diagram (such as the diagram 200).

Thus, in some embodiments, at least some processing components of at least one of the subsystems of the computing system are represented as a square icons, with each of the square icons including at least one of, for example, color-based information representative of data processing equipment type for an associated data processing component, color based information representative of the developmental status of the associated data processing component, a component name of the associated data processing component, a description of the associated data processing component, structure information for the associated data processing component, and information regarding the use/purpose for the associated data processing component.

Additionally, features of a given computing system, or of multiple inter-connected, computing systems, may be represented using other types of representation schemes.

Figures 2, 2A, 3:
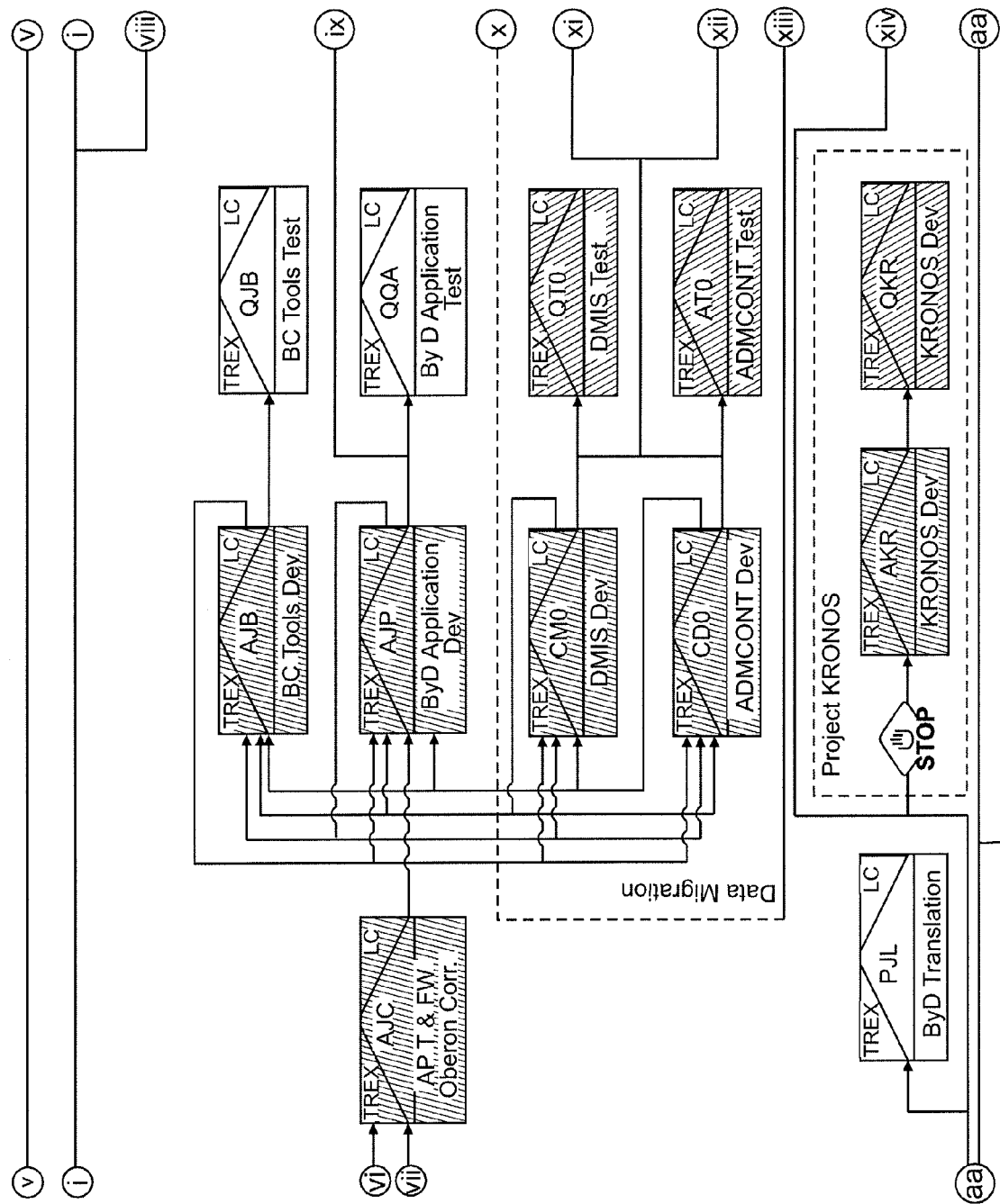
FIG. 3 is a flowchart of an example procedure to adapt imports.

FIG. 3 depicts a process 300 for adapting the import associated with a system included in a system landscape.

At 310, a landscape overview is generated including a context sensitive menu. For example, a system landscape overview, such as those depicted at FIGS. 1D, 2A, and 2B may be generated by the landscape generator 190. In some implementations, to generate such a diagram, data relating to features of the system is received (retrieved) at, for example, an application configured to generate a landscape diagram representative of such received data. The data from which data can be used may be collected automatically by, for example, having a data collection application, such as landscape generator 190 shown in FIG. 1E, query data repositories holding configuration information in relation to the system(s) whose features are to be represented. For example, in some implementations, queries may be sent to an interface used to access and manage configuration data, including landscape data, maintained for various systems (e.g., systems implemented using the computing system 100).

In some embodiments, system configuration and/or landscape data may be maintained, at least in part, in a landscape directory (which may be stored, in some embodiments, at a data repository (e.g., such as the data repository 114 shown in FIG. 1E) of the system 100). Such landscape data may be arranged in data records that are stored in clients' (tenants') individual landscapes. Further details regarding implementations and use of landscape directories, including landscape directories to manage systems implemented using cloud computing, are provided, for example, in U.S. application Ser. No. 12/953,300, entitled "Cloud-Processing Management With A Landscape Directory," the content of which is hereby incorporated by reference in its entirety. Briefly, a landscape directory may be used to enable automatic connection of pre-defined and pre-developed components (e.g., components that include other applications and tools) of systems/subsystems, including customer-specific systems, on-demand systems, etc. Such system management functionality may be implemented, at least in part, through use of a bundle of interfaces to provide clients access to the clients' shared and private landscape data in the landscape directory.

Landscape data at a landscape directory may also include data that defines the connectivity between various applications, and may define separate connectivity configurations for the various clients/tenants that use identified applications. A landscape directory may also be used to maintain access data pertaining to the accessibility of applications to be used by the various clients, and may include, for example, status and availability information for the various applications, e.g., whether service applications are active, information as to whether downtime is scheduled for any application, lifecycle status information (e.g., for a particular application, whether the application has been released, is obsolete, has been replaced by another application, etc.), and other such information. The data recorded in a landscape directory may thus be used to automatically determine, for example, communications paths and links between interacting subsystems (applications) identified in a particular landscape. Thus, in some embodiment, the data based on which diagrams may be generated may be received/collected from a landscape directory maintaining landscape data for multiple tenants with access to a computing system.

In some implementations, collection of configuration data (for the purpose of generating a diagram representative of various system features) may be performed by contacting various monitoring tools/applications, such as monitoring tool 108, deployed in the system 100 of FIG. 1E. When the system whose representation is to be rendered is implemented, at least in part, using cloud computing, similar monitoring tools/applications may be deployed with the cloud computing. The various deployed monitoring tools/applications may be configured to perform tests/diagnostics on some or all of the subsystems (e.g., applications) constituting the system to be represented, to determine, for example, the applications' status and availability. Examples of suitable monitoring tools/applications include tools based on SMD/Wily monitoring technology (SMD is SAP's Solution Manager Diagnostics tool for monitoring large scale installations), and other types of health checks and monitoring tools. A description of some possible monitoring tools and arrangements that may be used is provided, for example, in application Ser. No. 12/624,279, entitled "SYSTEM MONITORING," the content of which is hereby incorporated by reference in its entirety.

After receiving/collecting data relating to features of the computing system, a diagram that includes data (e.g., graphical data) representative of, at least partly, the features of the computing system is generated. The data included in the generated diagram (e.g., landscape diagram) includes data representative of, at least, an order of release of at least some of subsystems of the computing system, and layered relationship information, such as information about the layered relationships between various of the subsystems of the computing system. In some implementations, the landscape diagram may include text-based data, color-based date, pre-defined geometrical shapes representative of some features, and/or pre-define fill-pattern data representative of some other features.

Generation of the diagram based on the previously received data pertaining to system features may be performed automatically by, for example, an application such as the landscape generator 190 depicted in FIG. 1E, using the data to determine, for example, positions in the diagram, as well as the symbols' colors and geometric shapes that are to be rendered in the diagram. For example, components of a subsystem determined to be associated with a recent release of a particular subsystem would be positioned at a high vertical position relative to earlier releases of other components of the particular subsystem.

The determined data (e.g., position, colors, patterns, shapes, text-based information, etc.) is then generated into a page, such as a hypertext transfer language page, and rendered in the diagram presented at a user interface. Additionally and/or alternatively, in some embodiments, custom-made diagram-generating applications may be developed and used to generate diagrams such as the system landscape overview diagrams depicted at FIGS. 1D, 2A, and 2B.

The generated diagram may then be provided to a user interface for presentation. Such a user interface may be a user interface implemented at a server of a client (e.g., such as any of the clients 110A-C depicted in FIG. 1E).

Referring again to FIG. 3, a context sensitive menu is placed, at 320, within the system landscape. For example, job scheduler 195 may generate a context sensitive menu, such as menu 104B (FIG. 1D) and place menu 104B within, or adjacent to, the system landscape overview to allow adaptation of a system which is the subject of an import. In the example of FIG. 1D, system AJO 104E is the subject of an import adaptation. A user may select system AJO 104E and the context sensitive menu 104B and the information window 104D may be presented. The information window 104D provides information regarding the current schedule for the import (e.g., when data and/or software may be imported into system 104E), and the context sensitive menu 104B enables adaptation of that current schedule. At 320, a calculation engine 196 may determine the workflow (e.g., the impact of the import) and activate rules defining the installation of other systems in the landscape.

In the example of FIG. 1D, the context sensitive menu 104B allows the following selections: modify import time to allow changing when the import to system 104E occurs; modify import cycle to allow changing the series/frequencies of imports (e.g. daily or bi-weekly) occurs; deschedule imports for stopping imports to system 104E occurs; shift NWput for delaying an import; deschedule NWput for descheduling an imports (e.g., stopping imports permanently); and set/remove stop mark for temporarily stopping imports. This information is provided, at 320 to a calculation engine 196 to allow the calculation engine 196 to determine a workflow based on all of the systems of the landscape as well as the received information. At 330, the job scheduler 195 also uses the received information of 320 and other metadata data (including data depicted at the information window 104D) to adapt the schedule for when the import occurs for system 104E. For example, the context information from the context schedule may modify the import time to 4 PM, but metadata prohibits imports from 430 PM to 5 PM. In this example, the job scheduler may schedule the import as long as the duration of the import is less than the 30 minute window. Once the schedule is determined, the job scheduler initiates the import.

Figures 2, 2A, 3, 4:
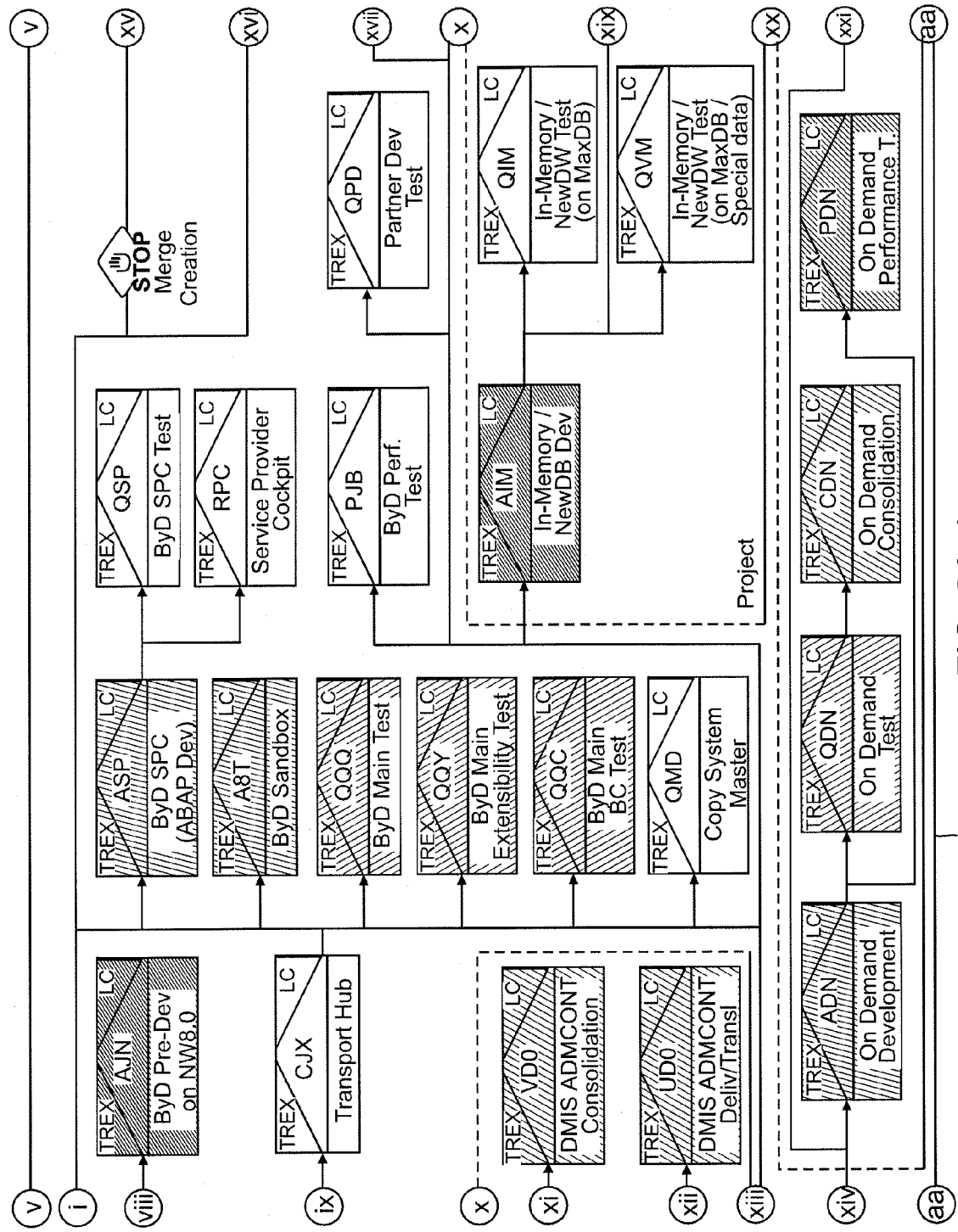
FIG. 4 is a schematic diagram of an example computing device that may be used in the implementation of any one of the various mechanisms described herein.
Figures 2, 2A, 3, 4, 5:
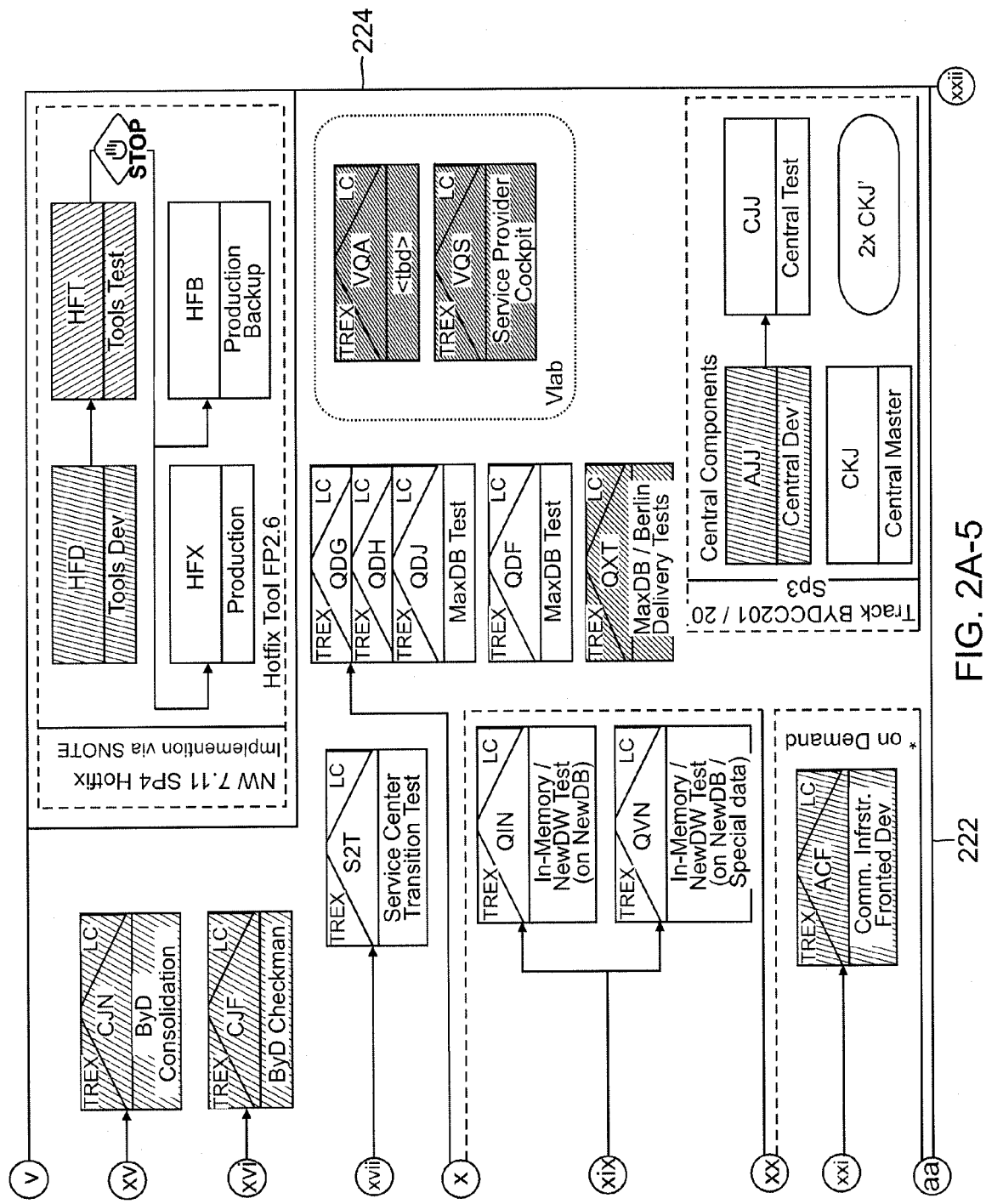
Figures 2, 2A, 3, 4, 5, 6:
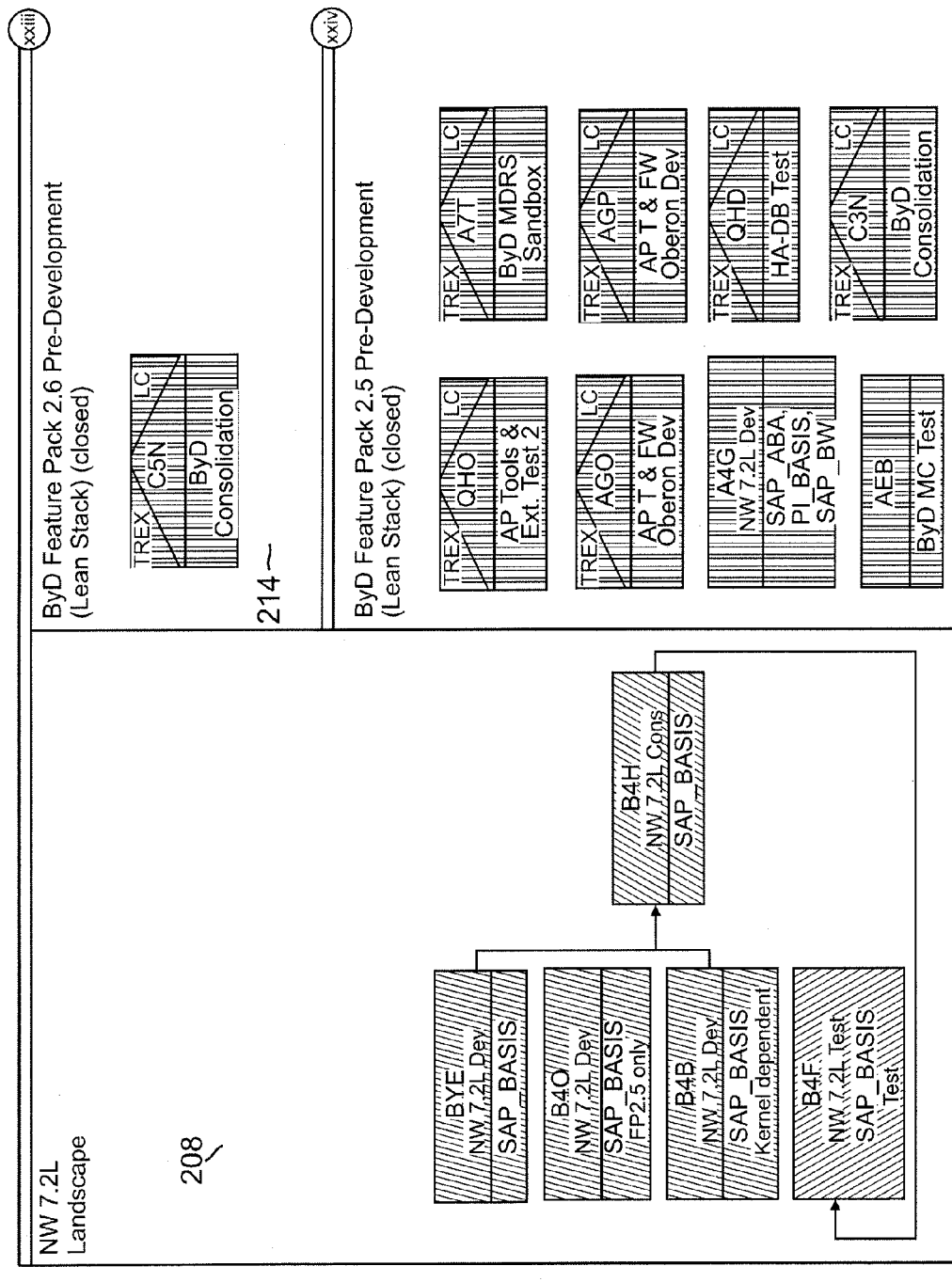
Figures 2, 2A, 3, 4, 5, 6, 7:
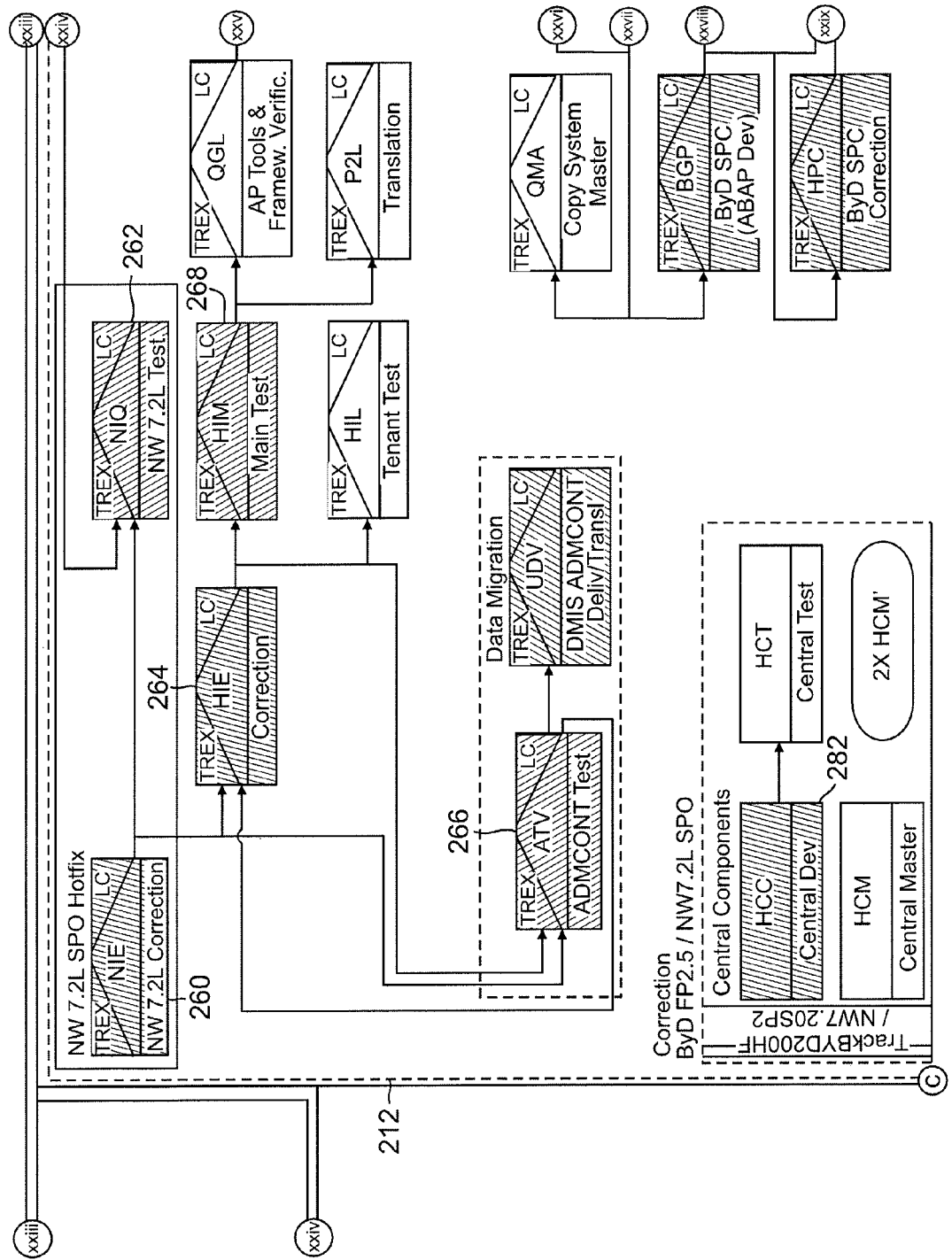
Figures 2, 2A, 3, 4, 5, 6, 7, 8:
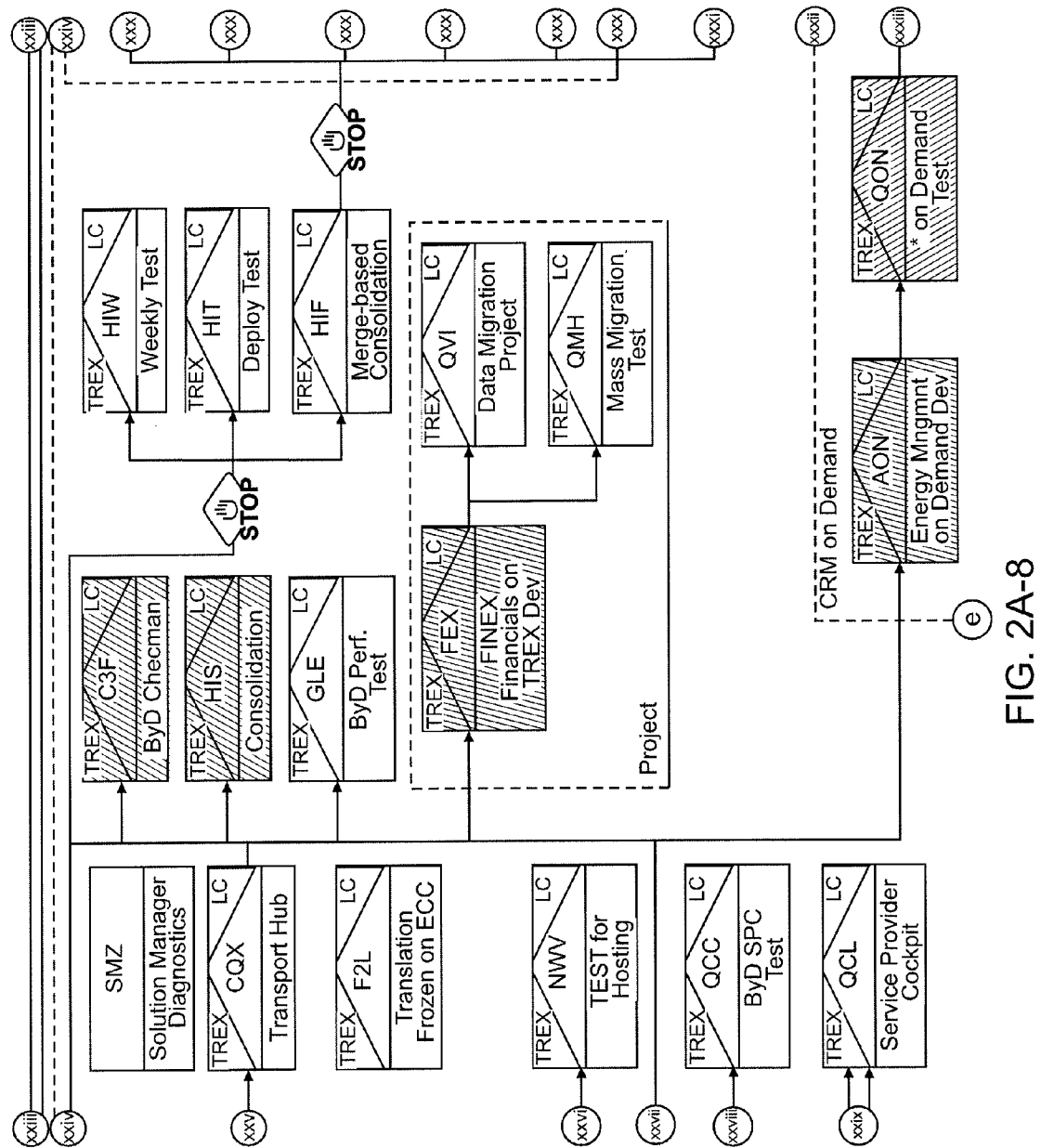
Figures 2, 2A, 3, 4, 5, 6, 7, 8, 9:
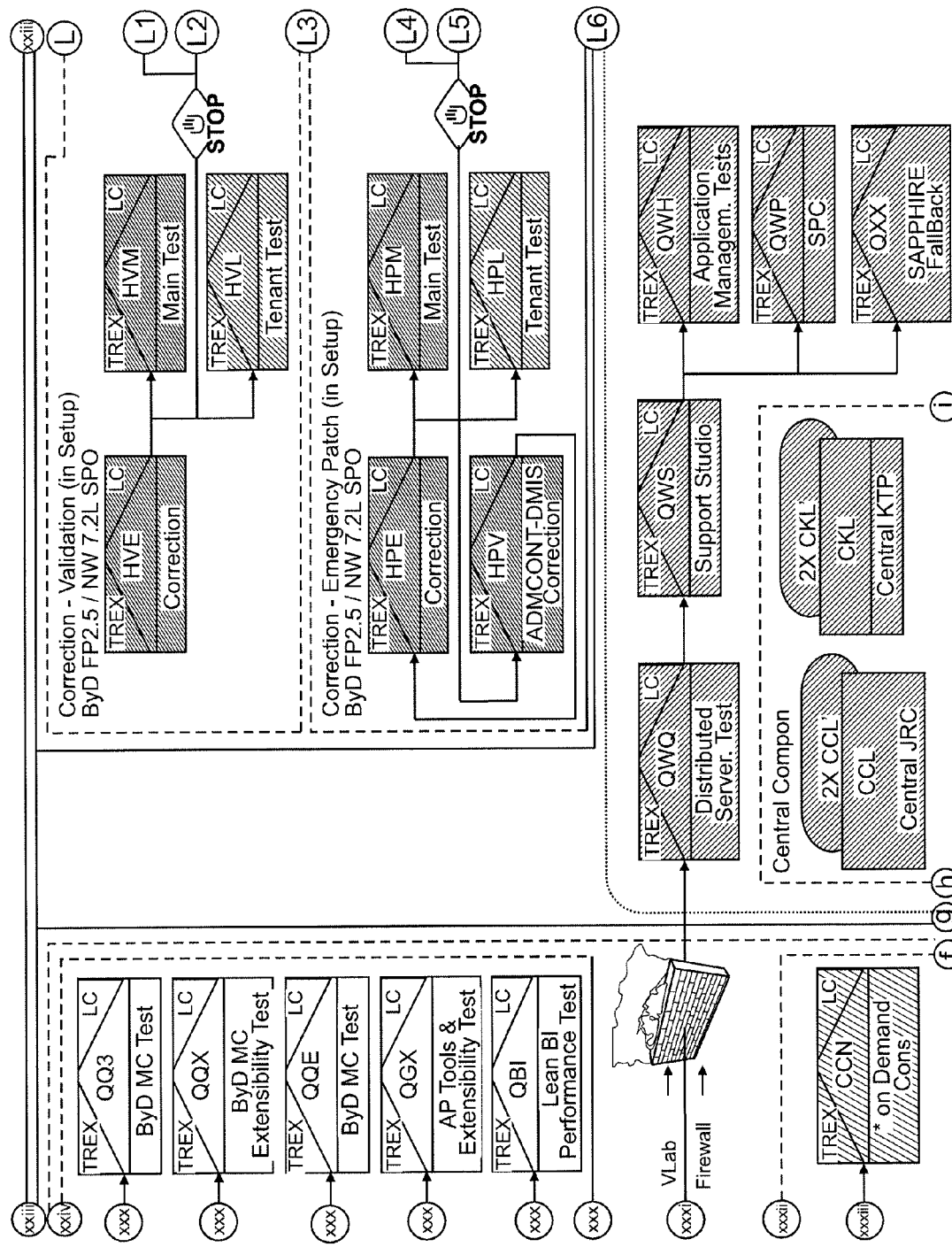
Figures 2, 2A, 3, 4, 5, 6, 7, 8, 9, 10, 11:
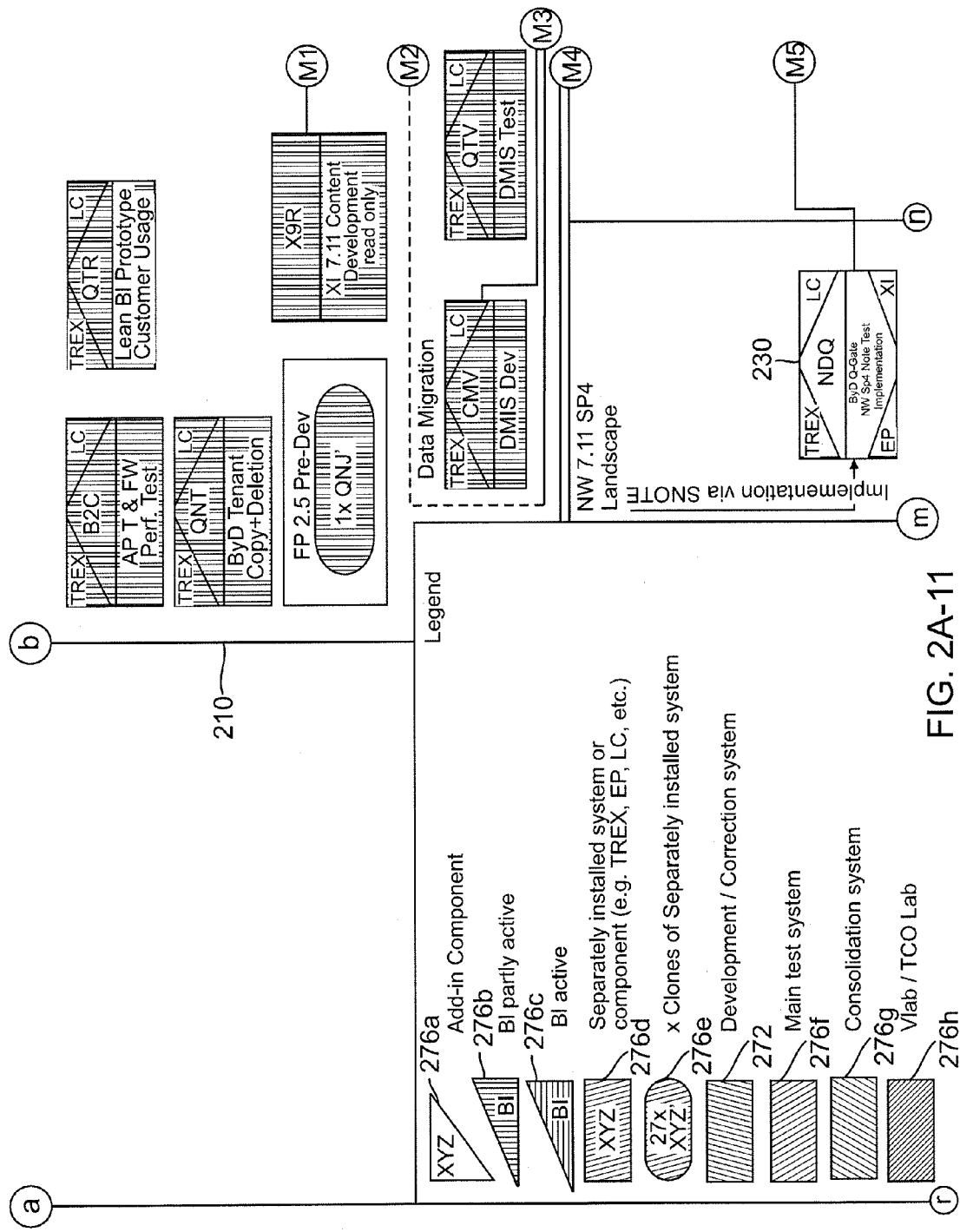
Figures 2, 2A, 3, 4, 5, 6, 7, 8, 9, 10, 11, 12:
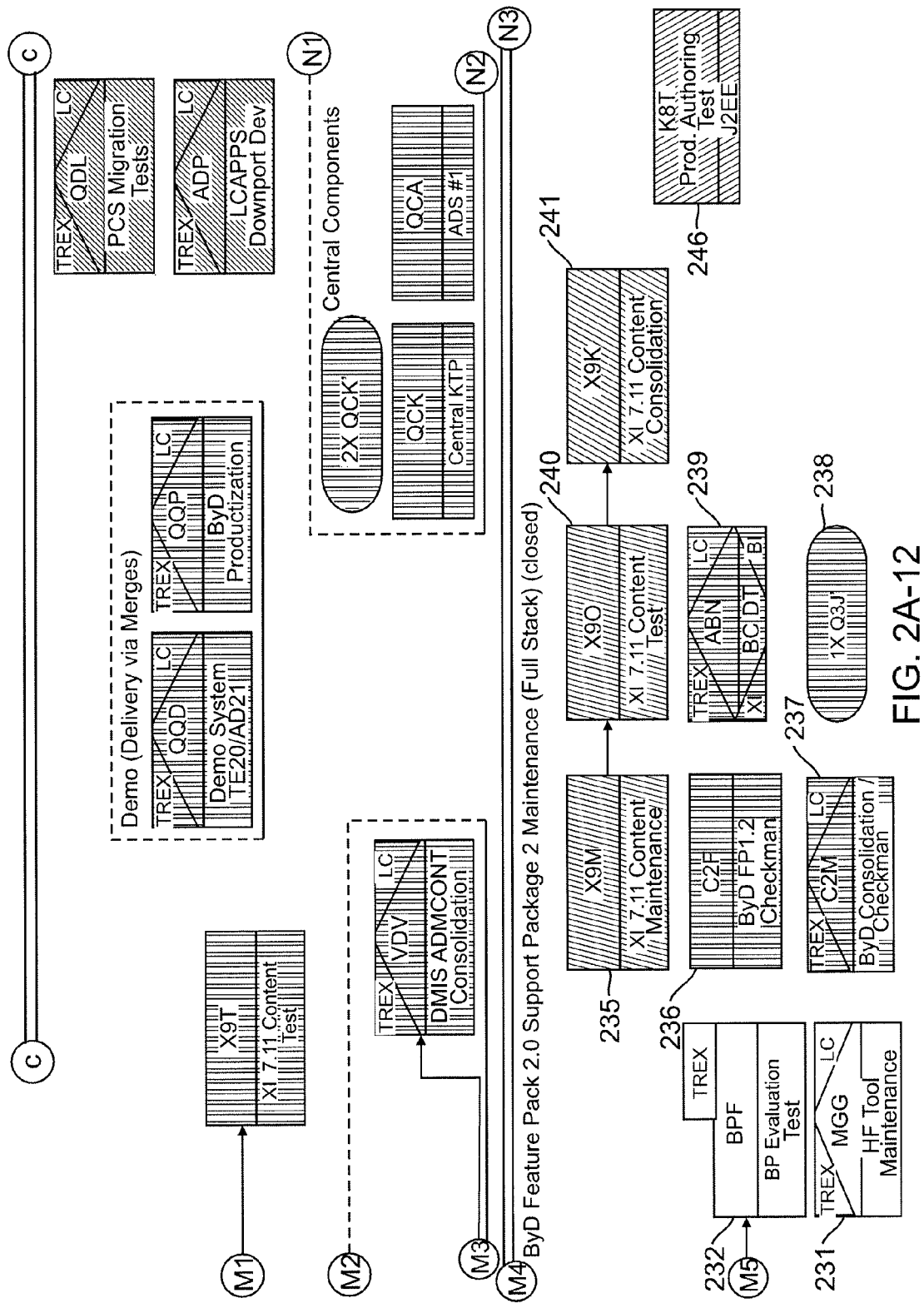
Figures 2, 2A, 3, 4, 5, 6, 7, 8, 9, 10, 11, 12, 13:
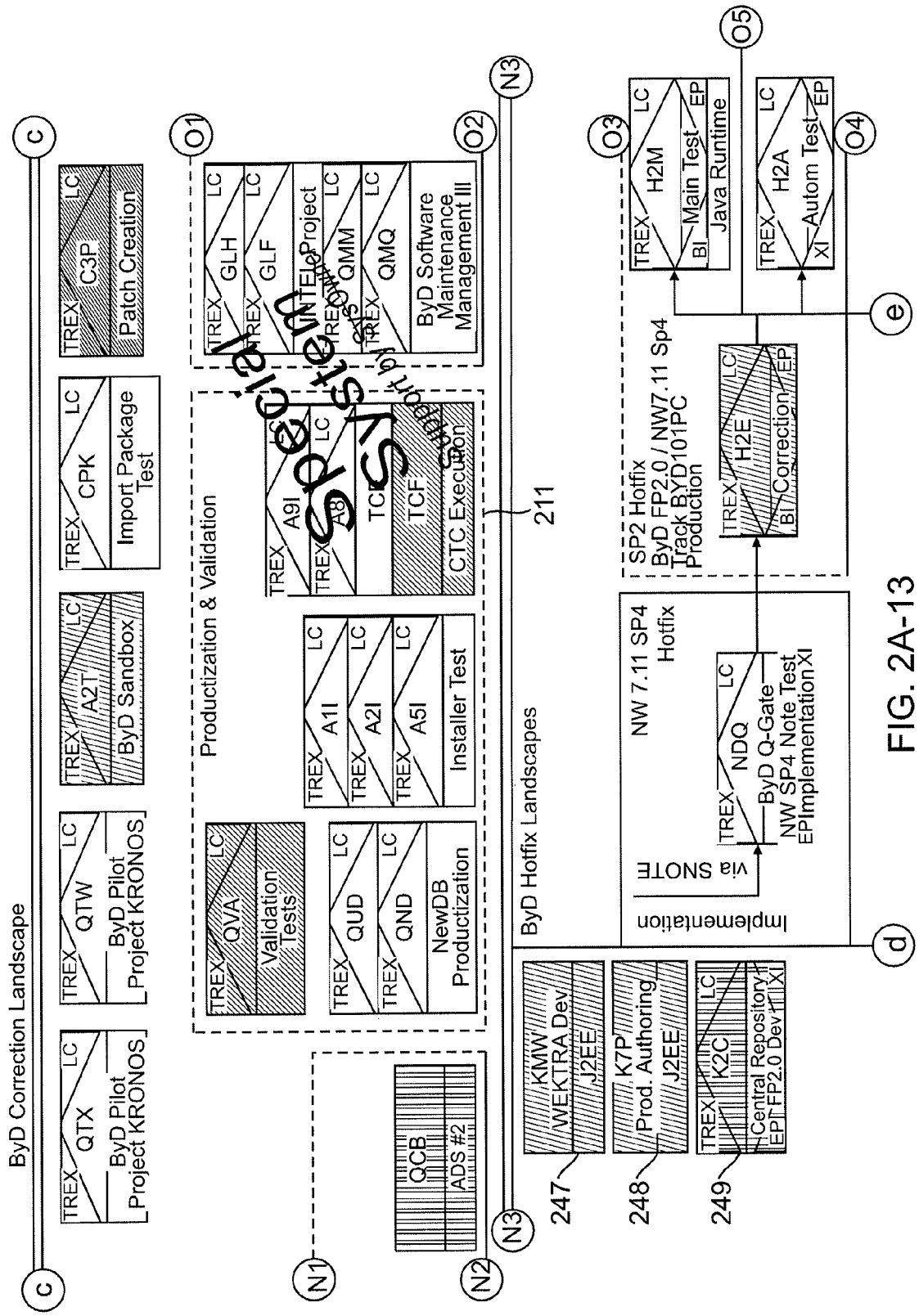
Figures 2, 2A, 3, 4, 5, 6, 7, 8, 9, 10, 11, 12, 13, 14:
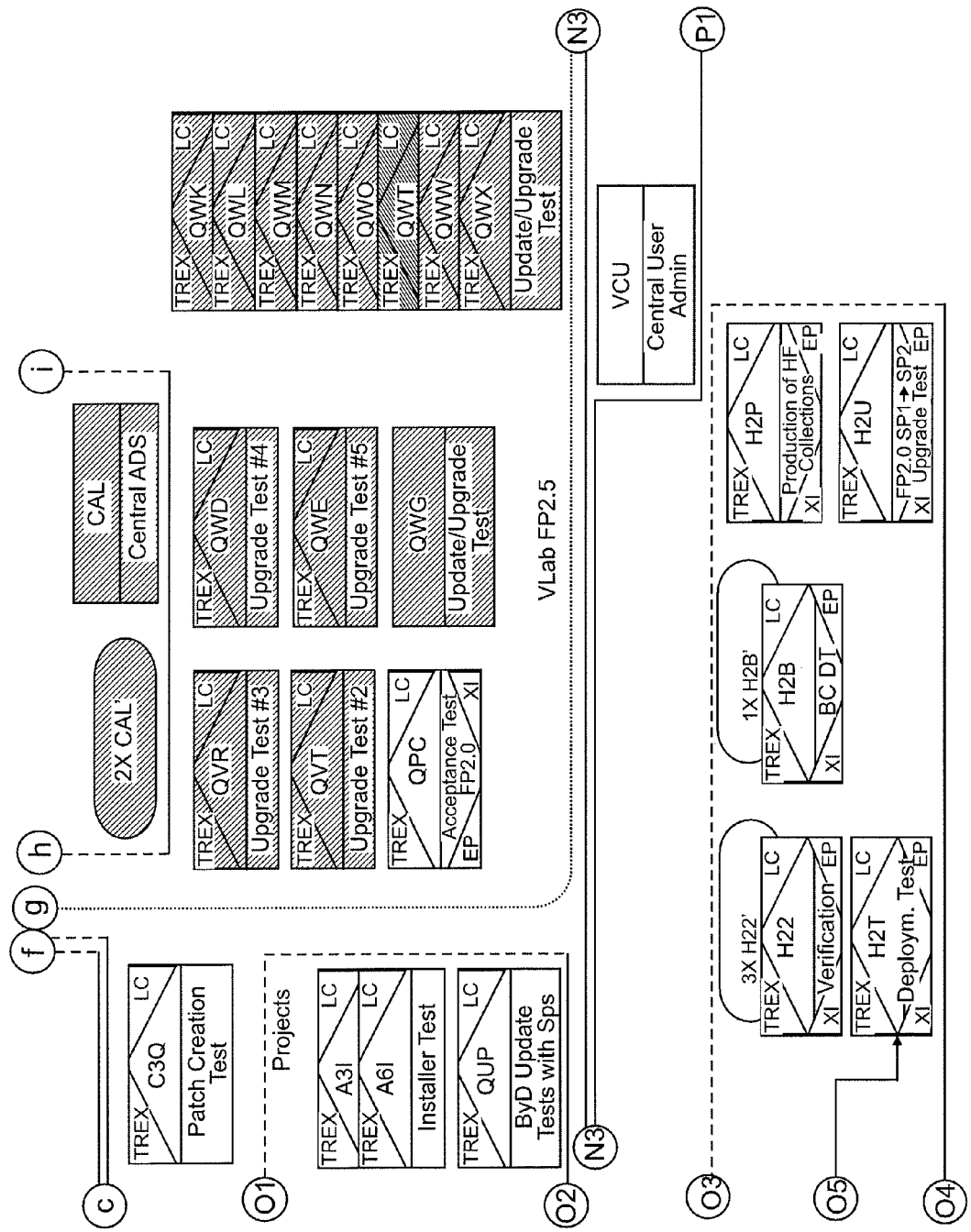
Figures 2, 2A, 3, 4, 5, 6, 7, 8, 9, 10, 11, 12, 13, 14, 15:
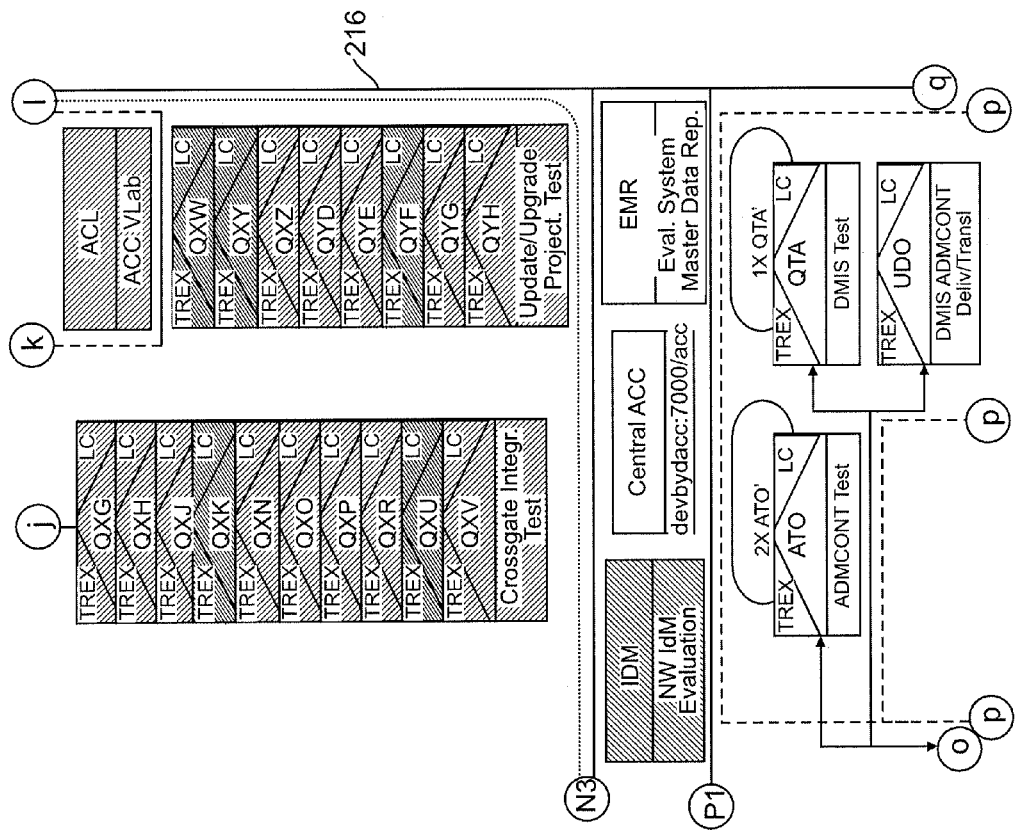
Figures 2, 2A, 3, 4, 5, 6, 7, 8, 9, 10, 11, 12, 13, 14, 15, 16:
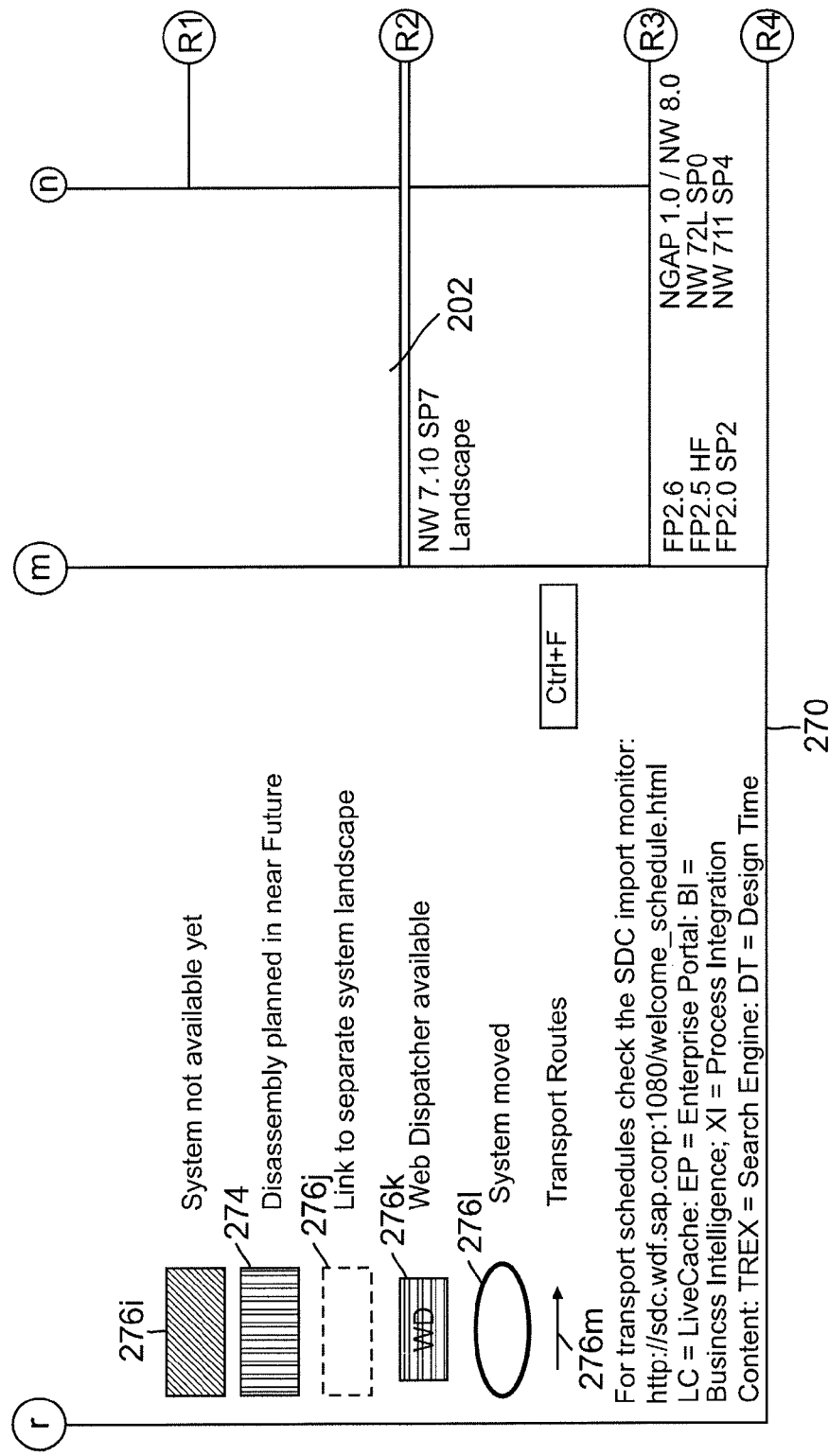
Figures 2, 2A, 3, 4, 5, 6, 7, 8, 9, 10, 11, 12, 13, 14, 15, 16, 17:
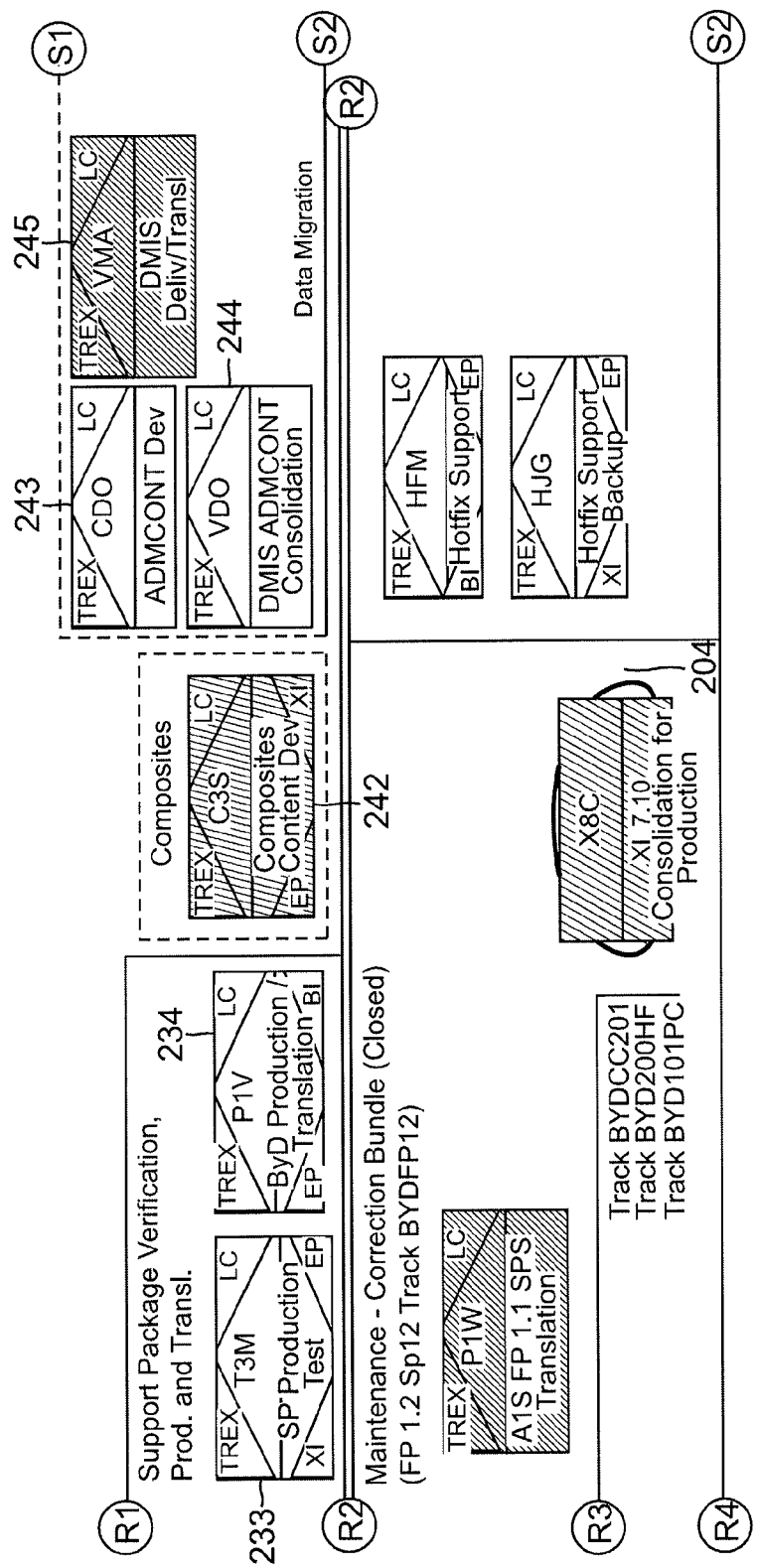
Figures 2, 2A, 3, 4, 5, 6, 7, 8, 9, 10, 11, 12, 13, 14, 15, 16, 17, 18:
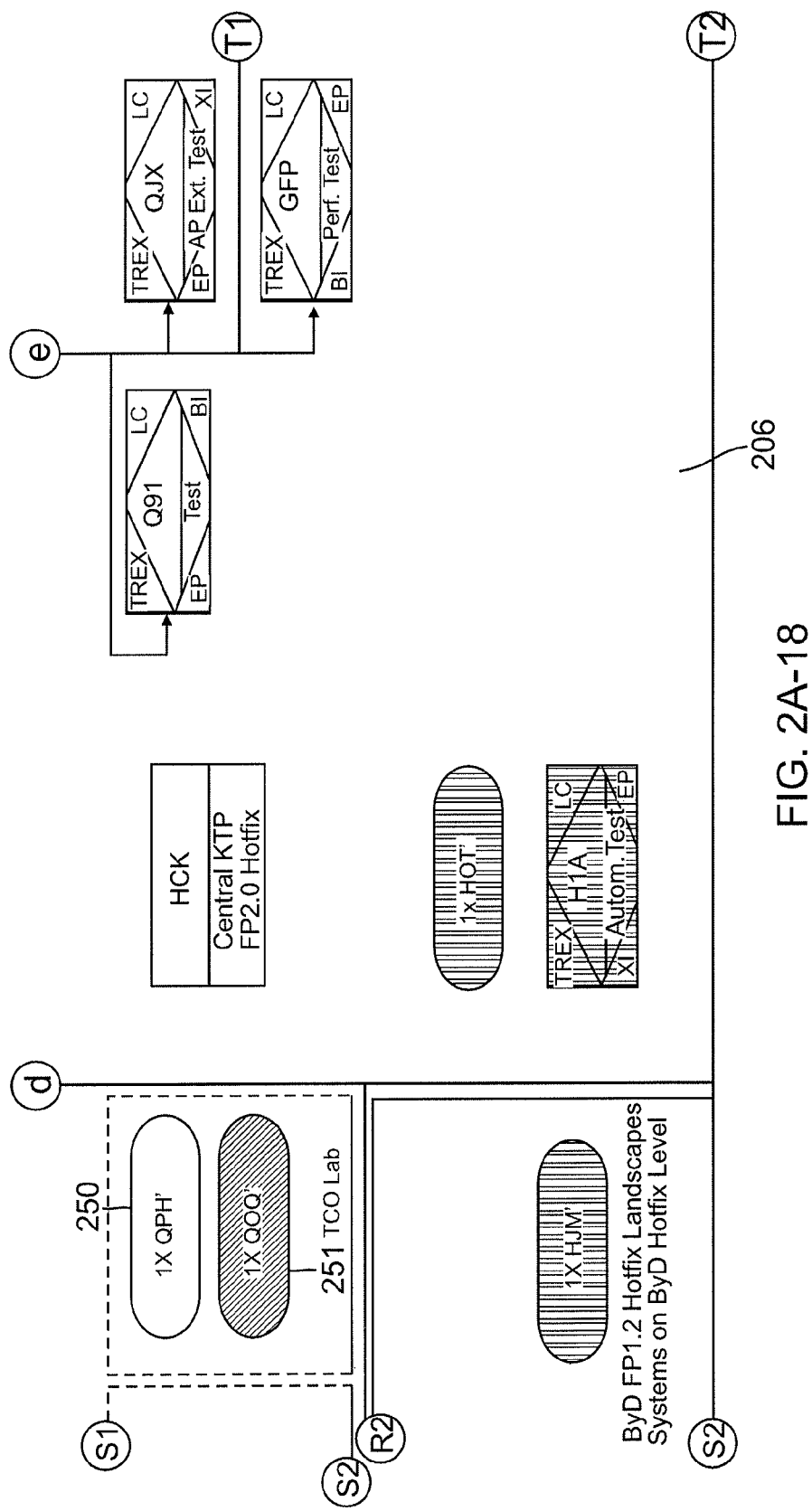
Figures 2, 2A, 3, 4, 5, 6, 7, 8, 9, 10, 11, 12, 13, 14, 15, 16, 17, 18, 19:
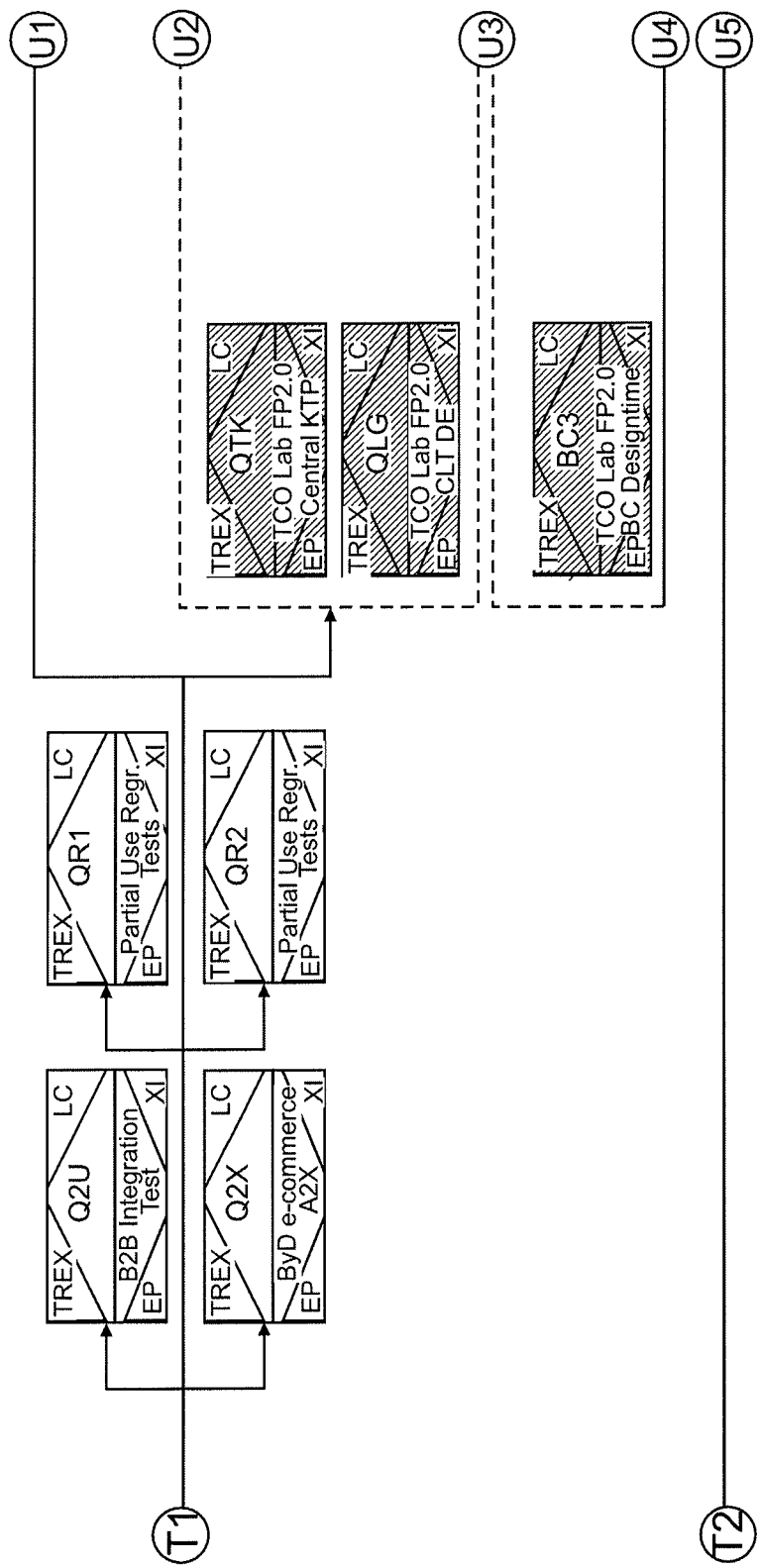
Figures 2, 2A, 3, 4, 5, 6, 7, 8, 9, 10, 11, 12, 13, 14, 15, 16, 17, 18, 19, 20:
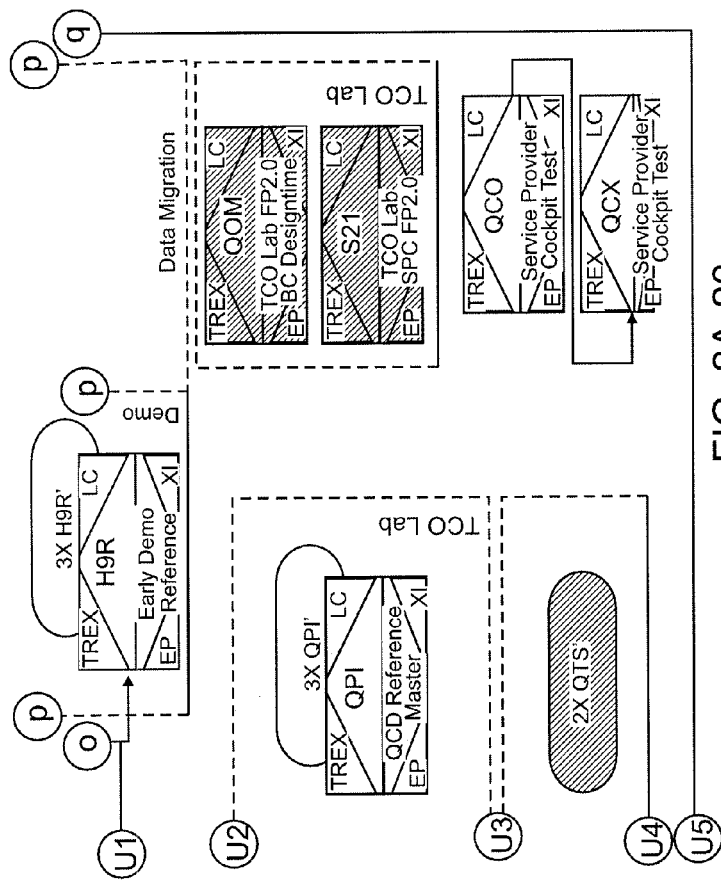
Figure 2B:
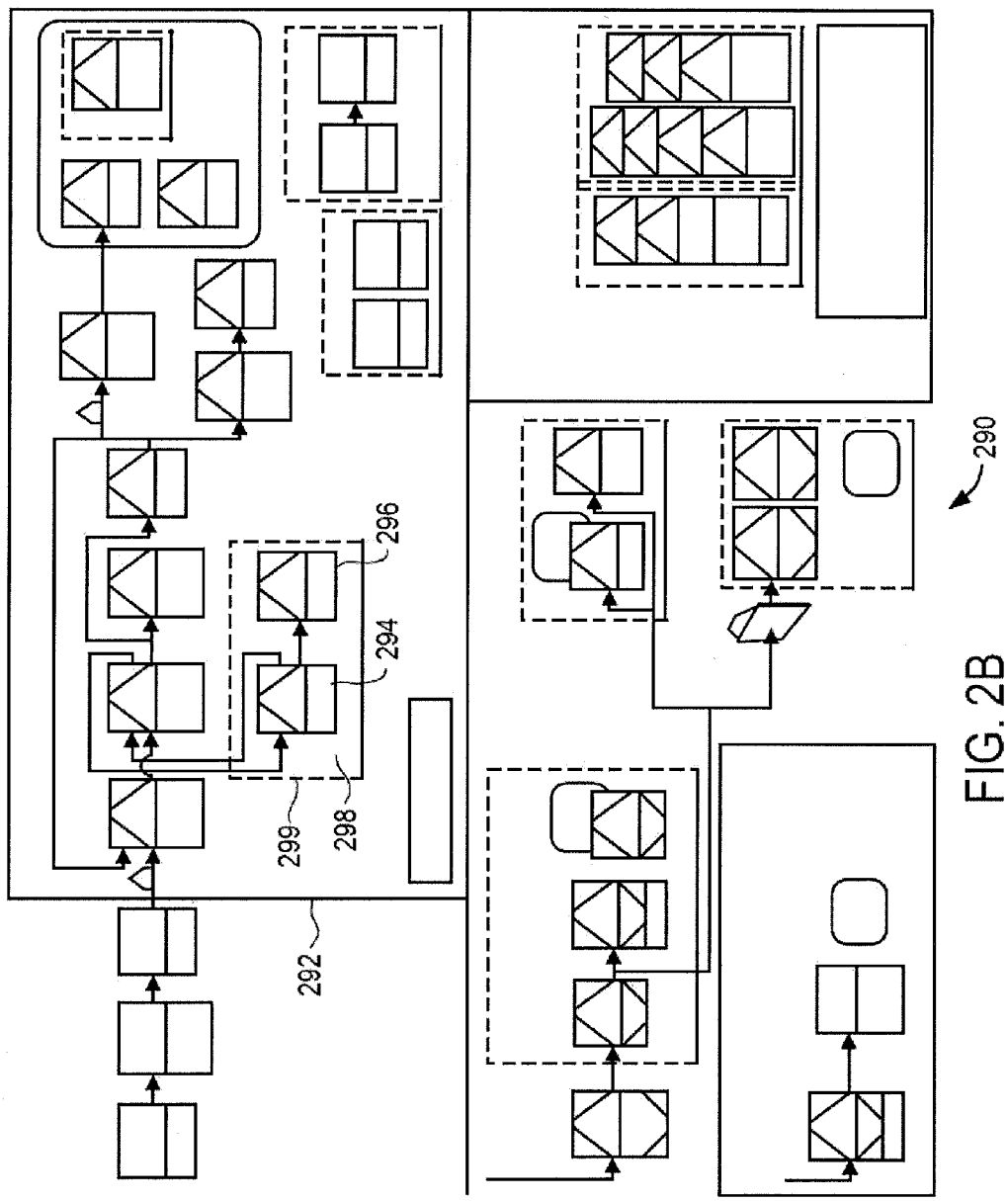
Figure 3:
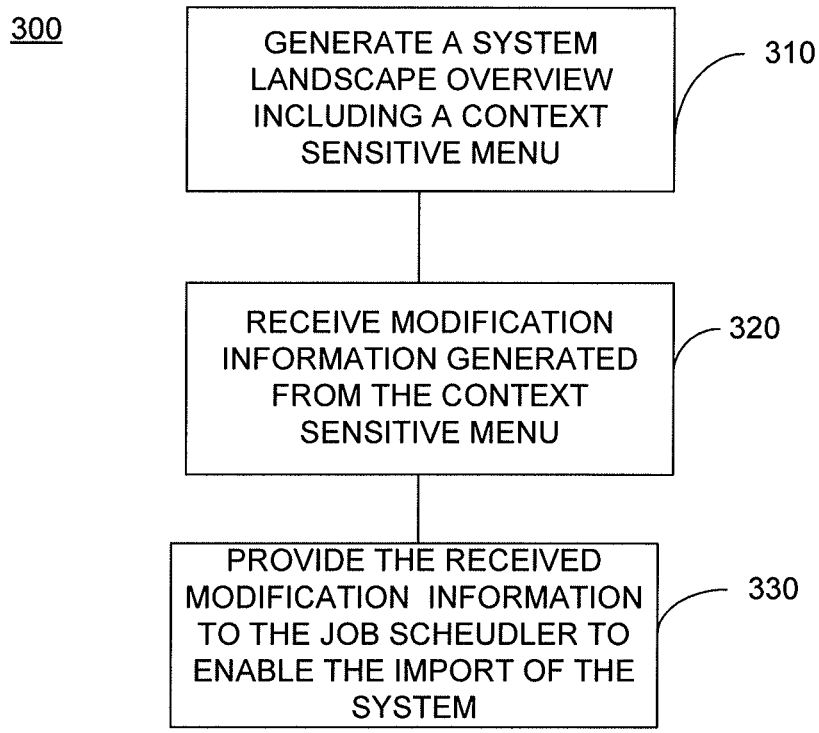
Figure 4:
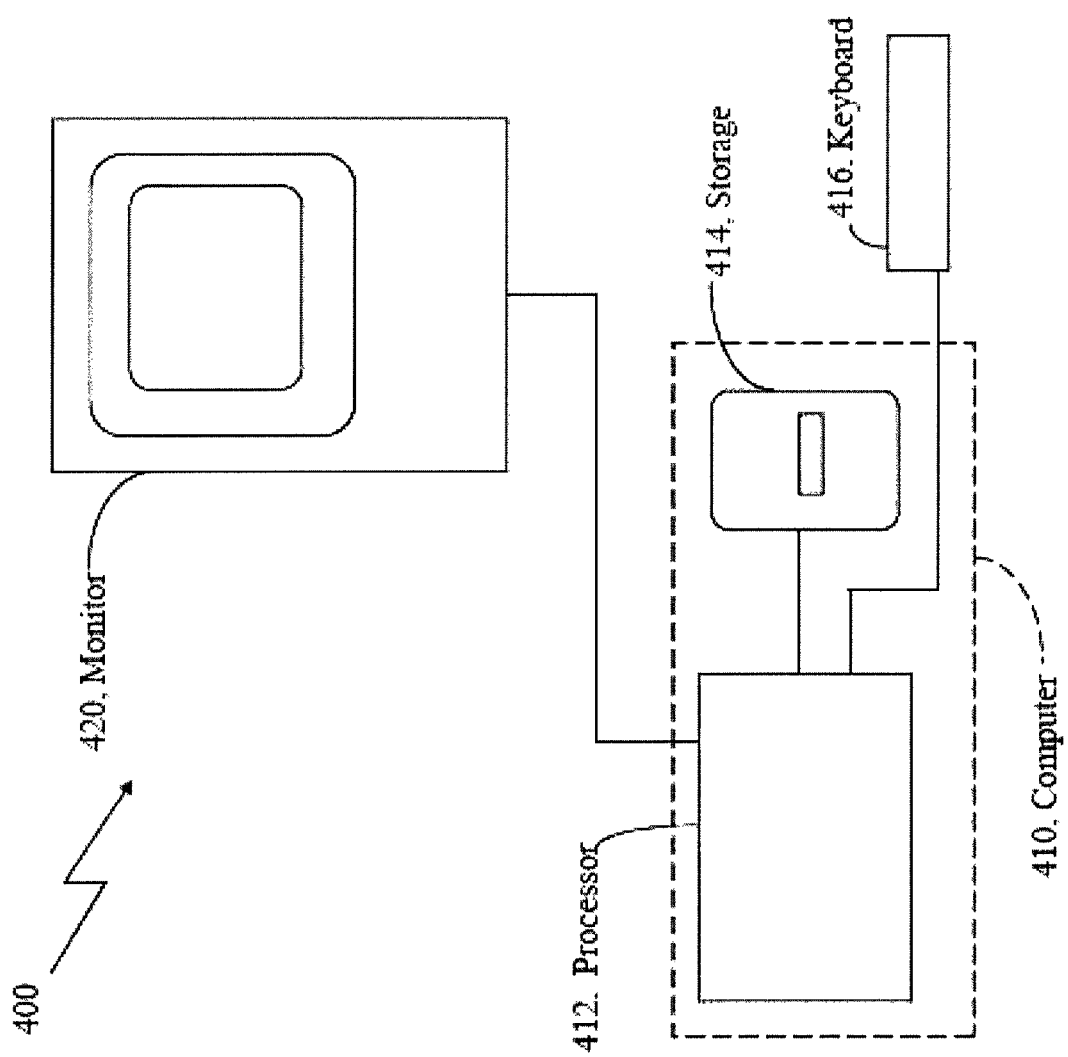

Each of the various systems/components/devices depicted in FIG. 1E may be implemented using a processor-based computing device. Referring to FIG. 4, a schematic diagram of a computing system 400 that may be used in the implementation of any one of the various depicted systems/components/devices of FIG. 1 is shown. The computing system 400 includes a processor-based device 410 such as a desktop or laptop computer, wireless device, a personal computer, a personal digital assistant, a smart phone, a tablet computer, a specialized computing device, a reading machine, and so forth that typically include a central processor unit 412. In addition to the central processor unit 412, the system includes one or more of the following: main memory, cache memory, bus interface circuits, network interfaces (e.g., wireless and/or wired), and a location processor. The processor-based device 410 may also include a mass storage element 414. The computing system 400 may further include an input device, such as a keyboard 416, and a display 420, e.g., a LCD (liquid crystal display) monitor.

The processor-based device 410 is configured to perform some or all of the operations described herein, including operations to collect and receive data relating to features of a computing system, and to generate, based on the received data, a diagram that includes graphical data representative of the system's features. The storage device 414 may include computer program products that when executed on the processor-based device 410 cause at least some of the operations for receiving data relating to system features and generating a diagram based, at least in part, on that data.

The processor-based device may further include peripheral devices to enable input/output functionality. Such peripheral devices include, for example, a DVD drive or a network connection, for downloading related content to the connected system. Such peripheral devices may also be used for downloading software containing computer instructions to enable general operation of the respective system/device, and for downloading software implemented programs to perform operations pertaining to the procedures and operations described herein. Alternatively and/or additionally, in some implementations, special purpose logic circuitry, e.g., an FPGA (field programmable gate array) or an ASIC (application-specific integrated circuit) may be used in the implementation of the system 400.

Other modules that may be included with the processor-based device 410 are speakers, a sound card, a pointing device, e.g., a mouse, a trackball, and/or a stylus, by which the user can provide input to the computing system 400. Other kinds of devices can be used to provide for interaction with a user. For example, feedback provided to the user can be any form of sensory feedback, e.g., visual feedback, auditory feedback, or tactile feedback, and input from the user can be received in any form, including acoustic, speech, tactile input, etc. The processor-based device 410 may include an operating system.

The subject matter described herein can be implemented in digital electronic circuitry, in computer software, firmware, hardware, or in combinations of them. The subject matter described herein can be implemented as one or more computer program products, i.e., one or more computer programs tangibly embodied in non-transitory media, e.g., in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server may arise by virtue of computer programs running on the respective computers and having a client-server relationship to each other.

A number of implementations of the invention have been described. Nevertheless, it will be understood that various modifications may be made without departing from the spirit and scope of the invention. Accordingly, other embodiments are within the scope of the following claims.

What is claimed is:

1. A method comprising:

generating a system landscape overview for presentation on a display including a context sensitive menu and an information window, the system landscape overview being representative of a system landscape comprising a plurality of systems identified by a unique identifier, the context sensitive menu enables a modification to an import to at least one of the plurality of systems, the information window and context sensitive menu being generated in response to the modification of the import with the context sensitive menu comprising a start time for the modification, the information window providing metadata for the at least one of the plurality of systems, the metadata including a rule for adapting the modification to at least one of the plurality of systems, the rule including at least one instruction and a time for adapting the modification to the at least one of the plurality of systems;

receiving, at a processor and from the context sensitive menu, the modification comprising information representative of a schedule for the import to the at least one of the plurality of systems;

determining, by a calculation engine, a workflow to install the import to at least one of the plurality of systems;

highlighting, based on the received modification, a first system of the plurality of systems in the system landscape overview, the highlighting of the first system indicating a location of an error associated with the modification within the system landscape;

receiving, from the context sensitive menu and based on the highlighting, an updated start time for adapting the import to the at least one of the plurality of systems; and providing the updated start time to a job scheduler to enable scheduling of the import to the at least one of the plurality of systems.

2. The method of claim 1, wherein the generating further comprises:

generating the system landscape overview as a page including graphical representations of the plurality of systems each identified by the unique identifier and further generating the context sensitive menu as a window presented within the page.

3. The method of claim 1, wherein the generating further comprises:

generating the system landscape overview as a page including graphical representations of the plurality of systems each identified by the unique identifier and further generating the context sensitive menu as a window, wherein the window and the information window are presented within the page.

4. The method of claim 3, wherein the page comprises a hypertext markup language page.

5. The method of claim 1, wherein the generating further comprises:

generating the context sensitive menu to include a plurality of commands to enable modifying the import to at least one of the plurality of systems.

6. The method of claim 1, wherein the enabling of the modification comprises modifying the import to the at least one of the plurality of systems.

7. The method of claim 1, wherein the enabling of the modification to the import comprises modifying a time when the import is imported to the at least one of the plurality of systems.

8. A system comprising:

at least one processor; and at least one memory including code which when executed by the at least one processor provides operations comprising:

generating a system landscape overview for presentation on a display including a context sensitive menu and an information window, the system landscape overview being representative of a system landscape comprising a plurality of systems identified by a unique identifier, the context sensitive menu enables a modification to an import to at least one of the plurality of systems, the information window and context sensitive menu being generated in response to the modification of the import with the context sensitive menu comprising a start time for the modification, the information window providing metadata for the at least one of the plurality of systems, the metadata including a rule for adapting the modification to at least one of the plurality of systems, the rule including at least one instruction and a time for adapting the modification to the at least one of the plurality of systems;

receiving, at a processor and from the context sensitive menu, the modification comprising information representative of a schedule for the import to the at least one of the plurality of systems;

determining, by a calculation engine, a workflow to install the import to at least one of the plurality of systems;

highlighting, based on the received modification, a first system of the plurality of systems in the system landscape overview, the highlighting of the first system indicating a location of an error associated with the modification within the system landscape;

receiving, from the context sensitive menu and based on the highlighting, an updated start time for adapting the import to the at least one of the plurality of systems; and providing the updated start time to a job scheduler to enable scheduling of the import to the at least one of the plurality of systems.

9. The system of claim 8, wherein the generating further comprises:

generating the system landscape overview as a page including graphical representations of the plurality of systems each identified by the unique identifier and further generating the context sensitive menu as a window presented within the page.

10. The system of claim 8, wherein the generating further comprises:

generating the system landscape overview as a page including graphical representations of the plurality of systems each identified by the unique identifier and further generating the context sensitive menu as a window, wherein the window and the information window are presented within the page.

11. The system of claim 10, wherein the page comprises a hypertext markup language page.

12. The system of claim 8, wherein the generating further comprises:

generating the context sensitive menu to include a plurality of commands to enable modifying the import to at least one of the plurality of systems.

13. A non-transitory computer-readable storage medium comprising code, which when executed by at least one processor provides operations comprising:

generating a system landscape overview for presentation on a display including a context sensitive menu and an information window, the system landscape overview being representative of a system landscape comprising a plurality of systems identified by a unique identifier, the context sensitive menu enables a modification to an import to at least one of the plurality of systems, the information window and context sensitive menu being generated in response to the modification of the import with the context sensitive menu comprising a start time for the modification, the information window providing metadata for the at least one of the plurality of systems, the metadata including a rule for adapting the modification to at least one of the plurality of systems, the rule including at least one instruction and a time for adapting the modification to the at least one of the plurality of systems;

receiving, at a processor and from the context sensitive menu, the modification comprising information representative of a schedule for the import to the at least one of the plurality of systems;

determining, by a calculation engine, a workflow to install the import to at least one of the plurality of systems;

highlighting, based on the received modification, a first system of the plurality of systems in the system landscape overview, the highlighting of the first system indicating a location of an error associated with the modification within the system landscape;

receiving, from the context sensitive menu and based on the highlighting, an updated start time for adapting the import to the at least one of the plurality of systems; and providing the updated start time to a job scheduler to enable scheduling of the import to the at least one of the plurality of systems.

14. The computer-readable storage medium of claim 13, wherein the generating further comprises:

generating the system landscape overview as a page including graphical representations of the plurality of systems each identified by the unique identifier and further generating the context sensitive menu as a window presented within the page.

15. The computer-readable storage medium of claim 13, wherein the generating further comprises:

generating the system landscape overview as a page including graphical representations of the plurality of systems each identified by the unique identifier and further generating the context sensitive menu as a window, wherein the window and the information window are presented within the page.

16. The computer-readable storage medium of claim 15, wherein the page comprises a hypertext markup language page.

17. The computer-readable storage medium of claim 13, wherein the generating further comprises:

generating the context sensitive menu to include a plurality of commands to enable modifying the import to at least one of the plurality of systems.

* * * * *